US012785738B2

(12) United States Patent
Liu et al.

(10) Patent No.: US 12,785,738 B2
(45) Date of Patent: Nov. 3, 2026

(54) COMMUNICATION METHOD AND RELATED APPARATUS

(71) Applicant: HUAWEI TECHNOLOGIES CO., LTD., Shenzhen (CN)

(72) Inventors: Fengwei Liu, Chengdu (CN); Zhongchong Peng, Chengdu (CN); Zhenfei Tang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 203 days.

(21) Appl. No.: 18/903,206

(22) Filed: Oct. 1, 2024

(65) Prior Publication Data

US 2025/0023593 A1 Jan. 16, 2025

Related U.S. Application Data

(63) Continuation of application No. PCT/CN2023/084945, filed on Mar. 30, 2023.

(30) Foreign Application Priority Data

Apr. 2, 2022 (CN) ......................... 202210343502.9

(51) Int. Cl.
*H04B 1/04* (2006.01)
*H04L 5/00* (2006.01)

(52) U.S. Cl.
CPC ......... *H04B 1/0483* (2013.01); *H04B 1/0475* (2013.01); *H04L 5/0048* (2013.01); *H04B 2001/0425* (2013.01)

(58) Field of Classification Search
CPC ................ H04B 1/0483; H04B 1/0475; H04B 2001/0425; H04B 1/525; H04B 17/101; H04B 17/20; H04L 5/0048; H04L 25/49
See application file for complete search history.

(56) References Cited

U.S. PATENT DOCUMENTS

| | | | | |
|---|---|---|---|---|
| 11,290,138 | B1 | 3/2022 | Kutz et al. | |
| 2019/0280730 | A1* | 9/2019 | Zhang | H04B 1/0458 |
| 2022/0052653 | A1* | 2/2022 | Pratt | H03F 3/211 |
| 2022/0385515 | A1* | 12/2022 | Kutz | H04B 1/04 |
| 2023/0179238 | A1* | 6/2023 | Kutz | H04W 4/06 375/297 |
| 2025/0105962 | A1* | 3/2025 | Dhakal | H04L 5/0048 |

* cited by examiner

*Primary Examiner* — Fayyaz Alam

(57) ABSTRACT

A first communication apparatus receives configuration information from a second communication apparatus, where the configuration information includes information about at least one resource. The first communication apparatus receives at least one signal from the second communication apparatus using the at least one resource. The first communication apparatus determines digital predistortion (DPD) parameter information based on the at least one signal received by the first communication apparatus, and then sends the DPD parameter information to the second communication apparatus.

20 Claims, 15 Drawing Sheets

COMMUNICATION METHOD AND RELATED APPARATUS

CROSS-REFERENCE TO RELATED APPLICATIONS

This application is a continuation of International Application No. PCT/CN2023/084945, filed on Mar. 30, 2023, which claims priority to Chinese Patent Application No. 202210343502.9, filed on Apr. 2, 2022. The disclosures of the aforementioned applications are hereby incorporated by reference in their entireties.

TECHNICAL FIELD

This application relates to the field of communication technologies, and in particular, to a communication method and a related apparatus.

BACKGROUND

A power amplifier (PA) can amplify a low power signal generated by a network device or a terminal device to a power level that can be used for long-distance transmission, to implement long-distance communication. Therefore, the PA is a core component of a wireless communication device. When the PA amplifies the power of a signal, the PA causes non-linear distortion. Consequently, the performance indicator of a transmitted signal deteriorates. For example, the non-linear distortion caused by the PA may result in performance degradation of an error vector magnitude and an adjacent channel leakage power ratio of the transmitted signal.

Therefore, how to compensate for the non-linear distortion caused by the PA is an urgent problem to be resolved.

SUMMARY

This application provides a communication method and a related apparatus, for a second communication apparatus to obtain first digital predistortion (DPD) parameter information, so that the second communication apparatus compensates, based on the first DPD parameter information, for signal non-linear distortion caused by a PA corresponding to a digital channel of the second communication apparatus and linearity of a signal output by the second communication apparatus is improved.

A first aspect of this application provides a communication method, including:

A first communication apparatus receives first configuration information from a second communication apparatus, where the first configuration information includes information about at least one resource. The first communication apparatus receives at least one first signal from the second communication apparatus by using the at least one resource.

The first communication apparatus determines first DPD parameter information based on the at least one first signal received by the first communication apparatus. The first communication apparatus sends the first DPD parameter information to the second communication apparatus.

In the foregoing technical solution, the first communication apparatus may configure the at least one resource for the first communication apparatus by using the first configuration information. The first communication apparatus receives the at least one first signal from the second communication apparatus by using the at least one resource, and measures the at least one first signal to obtain the first DPD parameter information. The first communication apparatus sends the first DPD parameter information to the second communication apparatus, so that the second communication apparatus compensates, based on the first DPD parameter information, for signal non-linear distortion caused by a plurality of PAs corresponding to a digital channel of the second communication apparatus and linearity of a signal output by the second communication apparatus is improved. In addition, in the first aspect, the second communication apparatus configures the at least one resource for the first communication apparatus, so that the at least one first signal is sent, and the second communication apparatus obtains the first DPD parameter information.

In a possible implementation, the method further includes:

The first communication apparatus receives second configuration information from the second communication apparatus, where the second configuration information is used to configure at least one of the following: a DPD parameter reporting format, a DPD model type used by the first communication apparatus to calculate a DPD parameter, a DPD model order, and a DPD model bandwidth. The DPD parameter reporting format indicates a reporting requirement for a non-linear order and a memory depth in the DPD parameter.

In this implementation, the second communication apparatus configures DPD-related information such as the DPD model type, the DPD model order, and the DPD model bandwidth. It is ensured that DPD-related information used by a receiving end and DPD-related information used by a transmitting end are unified, so that DPD parameter training efficiency is improved, and over the air digital predistortion (OTA DPD) is more suitable for an actual application scenario. In addition, the second communication apparatus may configure the DPD parameter reporting format for the first communication apparatus. In this way, the first communication apparatus may report some DPD parameters with reference to the DPD parameter reporting format, to reduce system overheads.

In another possible implementation, the DPD model order includes at least one of the following: the non-linear order, the memory depth, and a cross-term length.

In this implementation, some content included in the DPD model order is provided. It helps the first communication apparatus determine, based on the DPD model order, a DPD model used by the first communication apparatus, so that DPD models used by the receiving end and the transmitting end are unified, and the DPD parameter training efficiency is improved.

In another possible implementation, the at least one resource includes a first resource, and the first resource corresponds to a first antenna port.

In this implementation, the first resource corresponds to the first antenna port, in other words, the second communication apparatus may send the first signal through the first antenna port. It helps the first communication apparatus measure the first signal to obtain a DPD parameter of the first antenna port, and feed back the DPD parameter of the first antenna port to the second communication apparatus. In this way, the second communication apparatus compensates for a non-linear characteristic of the first antenna port by using the DPD parameter of the first antenna port, and the linearity of the signal output by the second communication apparatus is improved.

In another possible implementation, the first DPD parameter information includes information about a first DPD parameter, the information about the first DPD parameter is determined by the first communication apparatus based on a first signal received by using the first resource, and the information about the first DPD parameter is used to determine a transmission parameter of the first antenna port.

In this implementation, the first resource corresponds to the first antenna port, in other words, the second communication apparatus may send the first signal through the first antenna port. It helps the first communication apparatus measure the first signal to obtain the DPD parameter of the first antenna port, and feed back information about the DPD parameter of the first antenna port to the second communication apparatus, so that the second communication apparatus determines the transmission parameter of the first antenna port based on the information about the DPD parameter of the first antenna port. In this way, when sending a data signal, the second communication apparatus may perform DPD processing by using the transmission parameter of the first antenna port. In this way, the data signal is compensated in advance, and linearity of an output data signal is improved.

In another possible implementation, the at least one resource further includes a second resource, and the second resource corresponds to a second antenna port.

In this implementation, the second resource corresponds to the second antenna port, in other words, the second communication apparatus may send the first signal through the second antenna port. It helps the first communication apparatus measure the first signal to obtain a DPD parameter of the second antenna port, and feed back information about the DPD parameter of the second antenna port to the second communication apparatus. In this way, the second communication apparatus compensates for a non-linear characteristic of the second antenna port based on the information about the DPD parameter of the second antenna port, and the linearity of the signal output by the second communication apparatus is improved.

In another possible implementation, the first DPD parameter information further includes information about a second DPD parameter, the information about the second DPD parameter is determined by the first communication apparatus based on a first signal received by using the second resource, and the information about the second DPD parameter is used to determine a transmission parameter of the second antenna port.

In this implementation, the second resource corresponds to the second antenna port, in other words, the second communication apparatus may send the first signal through the second antenna port. It helps the first communication apparatus measure the first signal to obtain the DPD parameter of the second antenna port, and feed back the information about the DPD parameter of the second antenna port to the second communication apparatus, so that the second communication apparatus determines the transmission parameter of the second antenna port based on the information about the DPD parameter of the second antenna port. In this way, when sending a data signal, the second communication apparatus may perform DPD processing by using the transmission parameter of the second antenna port. In this way, the data signal is compensated in advance, and linearity of an output data signal is improved.

In another possible implementation, a time domain position occupied by the first resource is different from a time domain position occupied by the second resource.

In this implementation, the first resource and the second resource occupy different time domain positions. In other words, the second communication apparatus sends first signals of different antenna ports in a time-division sending manner, to avoid interference between digital channels corresponding to the different antenna ports, avoid deterioration of DPD parameter training performance, and improve a training effect of a DPD parameter.

In another possible implementation, the first resource corresponds to the first antenna port and a first beam direction.

In this implementation, the first resource further corresponds to the first beam direction. An antenna subarray connected to each digital channel may form beams in different directions. Model coefficients of equivalent PAs in each beam direction are also different. Therefore, the second communication apparatus may associate, by using a configuration of the first resource, a beam direction in which the first communication apparatus is located. It helps the second communication apparatus obtain the information about the DPD parameter of the first communication apparatus in a first beam direction.

A second aspect of this application provides a communication method. The method includes:

A second communication apparatus sends first configuration information to a first communication apparatus, where the first configuration information includes information about at least one resource. The second communication apparatus sends at least one first signal to the first communication apparatus by using the at least one resource. The second communication apparatus receives first DPD parameter information from the first communication apparatus, where the first DPD parameter information is determined by the first communication apparatus based on the at least one received first signal.

In the foregoing technical solution, the second communication apparatus sends the first configuration information to the first communication apparatus, where the first configuration information includes the information about the at least one resource. Then, the second communication apparatus sends the at least one first signal to the first communication apparatus by using the at least one resource. The second communication apparatus receives the first DPD parameter information from the first communication apparatus, where the first DPD parameter information is determined by the first communication apparatus based on the at least one received first signal, so that the second communication apparatus compensates, based on the first DPD parameter information, for signal non-linear distortion caused by a plurality of PAs corresponding to a digital channel of the second communication apparatus and linearity of a signal output by the second communication apparatus is improved. In addition, in the second aspect, the second communication apparatus configures the at least one resource for the first communication apparatus, so that the at least one first signal is sent, and the second communication apparatus obtains the first DPD parameter information.

In a possible implementation, the method further includes:

The second communication apparatus sends second configuration information to the first communication apparatus, where the second configuration information is used to configure at least one of the following: a DPD parameter reporting format, a DPD model type used by the first communication apparatus to calculate a DPD parameter, a DPD model order, and a DPD model bandwidth. The DPD parameter reporting format indicates a reporting requirement for a non-linear order and a memory depth in the DPD parameter.

In this implementation, the second communication apparatus configures DPD-related information such as the DPD model type, the DPD model order, and the DPD model bandwidth. It is ensured that DPD-related information used by a receiving end and DPD-related information used by a transmitting end are unified, so that DPD parameter training efficiency is improved, and OTA-DPD is more suitable for an actual application scenario. In addition, the second communication apparatus may configure the DPD parameter reporting format for the first communication apparatus. In this way, the first communication apparatus may report information about some DPD parameters with reference to the DPD parameter reporting format, to reduce system overheads.

In another possible implementation, the DPD model order includes at least one of the following: the non-linear order, the memory depth, and a cross-term length.

In this implementation, some content included in the DPD model order is provided. It helps the first communication apparatus determine, based on the DPD model order, a DPD model used by the first communication apparatus, so that DPD models used by the receiving end and the transmitting end are unified, and the DPD parameter training efficiency is improved.

In another possible implementation, the at least one resource includes a first resource, and the first resource corresponds to a first antenna port.

In this implementation, the first resource corresponds to the first antenna port, in other words, the second communication apparatus may send the first signal through the first antenna port. It helps the first communication apparatus measure the first signal to obtain a DPD parameter of the first antenna port, and feed back information about the DPD parameter of the first antenna port to the second communication apparatus. In this way, the second communication apparatus compensates for a non-linear characteristic of the first antenna port based on the information about the DPD parameter of the first antenna port, and the linearity of the signal output by the second communication apparatus is improved.

In another possible implementation, the first DPD parameter information includes information about a first DPD parameter, the information about the first DPD parameter is determined by the first communication apparatus based on a first signal received by using the first resource, and the information about the first DPD parameter is used to determine a transmission parameter of the first antenna port.

In this implementation, the first resource corresponds to the first antenna port, in other words, the second communication apparatus may send the first signal through the first antenna port. It helps the first communication apparatus measure the first signal to obtain the DPD parameter of the first antenna port, and feed back the information about the DPD parameter of the first antenna port to the second communication apparatus, so that the second communication apparatus determines the transmission parameter of the first antenna port based on the information about the DPD parameter of the first antenna port. In this way, when sending a data signal, the second communication apparatus may perform DPD processing by using the transmission parameter of the first antenna port. In this way, the data signal is compensated in advance, and linearity of an output data signal is improved.

In another possible implementation, the at least one resource further includes a second resource, and the second resource corresponds to a second antenna port.

In this implementation, the second resource corresponds to the second antenna port, in other words, the second communication apparatus may send the first signal through the second antenna port. It helps the first communication apparatus measure the first signal to obtain a DPD parameter of the second antenna port, and feed back information about the DPD parameter of the second antenna port to the second communication apparatus. In this way, the second communication apparatus compensates for a non-linear characteristic of the second antenna port based on the information about the DPD parameter of the second antenna port, and the linearity of the signal output by the second communication apparatus is improved.

In another possible implementation, the first DPD parameter information further includes information about a second DPD parameter, the information about the second DPD parameter is determined by the first communication apparatus based on a first signal received by using the second resource, and the information about the second DPD parameter is used to determine a transmission parameter of the second antenna port.

In this implementation, the second resource corresponds to the second antenna port, in other words, the second communication apparatus may send the first signal through the second antenna port. It helps the first communication apparatus measure the first signal to obtain the DPD parameter of the second antenna port, and feed back the information about the DPD parameter of the second antenna port to the second communication apparatus, so that the second communication apparatus determines the transmission parameter of the second antenna port based on the information about the DPD parameter of the second antenna port. In this way, when sending a data signal, the second communication apparatus may perform DPD processing by using the transmission parameter of the second antenna port. In this way, the data signal is compensated in advance, and linearity of an output data signal is improved.

In another possible implementation, a time domain position occupied by the first resource is different from a time domain position occupied by the second resource.

In this implementation, the first resource and the second resource occupy different time domain positions. In other words, the second communication apparatus sends first signals of different antenna ports in a time-division sending manner, to avoid interference between digital channels corresponding to the different antenna ports, avoid deterioration of DPD parameter training performance, and improve a training effect of a DPD parameter.

In another possible implementation, the first resource corresponds to the first antenna port and a first beam direction.

In this implementation, the first resource further corresponds to the first beam direction. An antenna subarray connected to each digital channel may form beams in different directions. Model coefficients of equivalent PAs in each beam direction are also different. Therefore, the second communication apparatus may associate, by using a configuration of the first resource, a beam direction in which the first communication apparatus is located. It helps the second communication apparatus obtain the DPD parameter of the first communication apparatus in a first beam direction.

In another possible implementation, the method further includes:

The second communication apparatus determines, based on the first DPD parameter information, a transmission parameter of an antenna port configured to send the at least one first signal.

In this implementation, the second communication apparatus determines, based on the first DPD parameter information, the transmission parameter of the antenna port configured to send the at least one first signal. In this way, when sending a data signal, the second communication apparatus may perform DPD processing by using the transmission parameter of the antenna port configured to send the at least one first signal. In this way, the data signal is compensated in advance, and linearity of an output data signal is improved.

A third aspect of this application provides a communication method, including:

A first communication apparatus receives second configuration information from a second communication apparatus, where the second configuration information is used to configure at least one of the following: a DPD parameter reporting format, a DPD model type used by the first communication apparatus to calculate a DPD parameter, a DPD model order, and a DPD model bandwidth. The DPD parameter reporting format indicates a reporting requirement for a non-linear order and a memory depth in the DPD parameter. The first communication apparatus receives at least one first signal from the second communication apparatus. The first communication apparatus determines first DPD parameter information based on the at least one first signal received by the first communication apparatus and the second configuration information. The first communication apparatus sends the first DPD parameter information to the second communication apparatus based on the second configuration information.

In the foregoing technical solution, the second communication apparatus configures DPD-related information such as the DPD model type, the DPD model order, and the DPD model bandwidth. It is ensured that DPD-related information used by a receiving end and DPD-related information used by a transmitting end are unified. The first communication apparatus determines the first DPD parameter information based on the at least one first signal received by the first communication apparatus and the second configuration information, so that DPD parameter training efficiency is improved, and OTA DPD is more suitable for an actual application scenario. In addition, the second communication apparatus may configure the DPD parameter reporting format for the first communication apparatus, to help reduce system overheads. For example, if the DPD parameter reporting format indicates the first communication apparatus to report information about some DPD parameters, the first communication apparatus may report only the information about some DPD parameters. In this way, system overheads are reduced.

In another possible implementation, the DPD model order includes at least one of the following: the non-linear order, the memory depth, and a cross-term length.

In this implementation, some content included in the DPD model order is provided. It helps the first communication apparatus determine, based on the DPD model order, a DPD model used by the first communication apparatus, so that DPD models used by the receiving end and the transmitting end are unified, and the DPD parameter training efficiency is improved.

A fourth aspect of this application provides a communication method, including:

A second communication apparatus sends second configuration information to a first communication apparatus, where the second configuration information is used to configure at least one of the following: a DPD parameter reporting format, a DPD model type used by the first communication apparatus to calculate a DPD parameter, a DPD model order, and a DPD model bandwidth. The DPD parameter reporting format indicates a reporting requirement for a non-linear order and a memory depth in the DPD parameter. The second communication apparatus sends at least one first signal to the first communication apparatus. The second communication apparatus receives first DPD parameter information from the first communication apparatus, where the first DPD parameter information is determined by the first communication apparatus based on the at least one first signal received by the first communication apparatus and the first DPD parameter information.

In the foregoing technical solution, the second communication apparatus configures DPD-related information such as the DPD model type, the DPD model order, and the DPD model bandwidth. The first DPD parameter information is determined by the first communication apparatus based on the at least one first signal received by the first communication apparatus and the first DPD parameter information. It is ensured that DPD-related information used by a receiving end and DPD-related information used by a transmitting end are unified, so that DPD parameter training efficiency is improved, and OTA DPD is more suitable for an actual application scenario. In addition, the second communication apparatus may configure the DPD parameter reporting format for the first communication apparatus, to help reduce system overheads. For example, if the DPD parameter reporting format indicates the first communication apparatus to report information about some DPD parameters, the first communication apparatus may report only the information about some DPD parameters. In this way, system overheads are reduced.

In another possible implementation, the DPD model order includes at least one of the following: the non-linear order, the memory depth, and a cross-term length.

In this implementation, some content included in the DPD model order is provided. It helps the first communication apparatus determine, based on the DPD model order, a DPD model used by the first communication apparatus, so that DPD models used by the receiving end and the transmitting end are unified, and the DPD parameter training efficiency is improved.

A fifth aspect of this application provides a first communication apparatus. The first communication apparatus includes:

- a transceiver module, configured to receive first configuration information from a second communication apparatus, where the first configuration information includes information about at least one resource; and receive at least one first signal from the second communication apparatus by using the at least one resource; and
- a processing module, configured to determine first DPD parameter information based on the at least one first signal received by the first communication apparatus, where the transceiver module is further configured to send the first DPD parameter information to the second communication apparatus.

In a possible implementation, the transceiver module is further configured to:

- receive second configuration information from the second communication apparatus, where the second configuration information is used to configure at least one of the following: a DPD parameter reporting format, a DPD model type used by the first communication apparatus to calculate a DPD parameter, a DPD model order, and a DPD model bandwidth, where the DPD parameter reporting format indicates a reporting requirement for a non-linear order and a memory depth in the DPD parameter.

In another possible implementation, the DPD model order includes at least one of the following: the non-linear order, the memory depth, and a cross-term length.

In another possible implementation, the at least one resource includes a first resource, and the first resource corresponds to a first antenna port.

In another possible implementation, the first DPD parameter information includes information about a first DPD parameter, the information about the first DPD parameter is determined by the first communication apparatus based on a first signal received by using the first resource, and the information about the first DPD parameter is used to determine a transmission parameter of the first antenna port.

In another possible implementation, the at least one resource further includes a second resource, and the second resource corresponds to a second antenna port.

In another possible implementation, the first DPD parameter information further includes information about a second DPD parameter, the information about the second DPD parameter is determined by the first communication apparatus based on a first signal received by using the second resource, and the information about the second DPD parameter is used to determine a transmission parameter of the second antenna port.

In another possible implementation, a time domain position occupied by the first resource is different from a time domain position occupied by the second resource.

In another possible implementation, the first resource corresponds to the first antenna port and a first beam direction.

A sixth aspect of this application provides a second communication apparatus. The second communication apparatus includes:

a transceiver module, configured to send first configuration information to a first communication apparatus, where the first configuration information includes information about at least one resource; send at least one first signal to the first communication apparatus by using the at least one resource; and receive first DPD parameter information from the first communication apparatus, where the first DPD parameter information is determined by the first communication apparatus based on the at least one received first signal.

In a possible implementation, the transceiver module is further configured to:

send second configuration information to the first communication apparatus, where the second configuration information is used to configure at least one of the following: a DPD parameter reporting format, a DPD model type used by the first communication apparatus to calculate a DPD parameter, a DPD model order, and a DPD model bandwidth, where the DPD parameter reporting format indicates a reporting requirement for a non-linear order and a memory depth in the DPD parameter.

In another possible implementation, the DPD model order includes at least one of the following: the non-linear order, the memory depth, and a cross-term length.

In another possible implementation, the at least one resource includes a first resource, and the first resource corresponds to a first antenna port.

In another possible implementation, the first DPD parameter information includes information about a first DPD parameter, the information about the first DPD parameter is determined by the first communication apparatus based on a first signal received by using the first resource, and the information about the first DPD parameter is used to determine a transmission parameter of the first antenna port.

In another possible implementation, the at least one resource further includes a second resource, and the second resource corresponds to a second antenna port.

In another possible implementation, the first DPD parameter information further includes information about a second DPD parameter, the information about the second DPD parameter is determined by the first communication apparatus based on a first signal received by using the second resource, and the information about the second DPD parameter is used to determine a transmission parameter of the second antenna port.

In another possible implementation, a time domain position occupied by the first resource is different from a time domain position occupied by the second resource.

In another possible implementation, the first resource corresponds to the first antenna port and a first beam direction.

In another possible implementation, the second communication apparatus includes a processing module.

The processing module is configured to determine, based on the first DPD parameter information, a transmission parameter of an antenna port configured to send the at least one first signal.

A seventh aspect of this application provides a first communication apparatus. The first communication apparatus includes:

a transceiver module, configured to receive second configuration information from a second communication apparatus, where the second configuration information is used to configure at least one of the following: a DPD parameter reporting format, a DPD model type used by the first communication apparatus to calculate a DPD parameter, a DPD model order, and a DPD model bandwidth, where the DPD parameter reporting format indicates a reporting requirement for a non-linear order and a memory depth in the DPD parameter; and receive at least one first signal from the second communication apparatus; and a processing module, configured to determine first DPD parameter information based on the at least one first signal received by the first communication apparatus and the second configuration information, where the transceiver module is further configured to send the first DPD parameter information to the second communication apparatus based on the second configuration information.

In another possible implementation, the DPD model order includes at least one of the following: the non-linear order, the memory depth, and a cross-term length.

An eighth aspect of this application provides a second communication apparatus. The second communication apparatus includes:

a transceiver module, configured to send second configuration information to a first communication apparatus, where the second configuration information is used to configure at least one of the following: a DPD parameter reporting format, a DPD model type used by the first communication apparatus to calculate a DPD parameter, a DPD model order, and a DPD model bandwidth, where the DPD parameter reporting format indicates a reporting requirement for a non-linear order and a memory depth in the DPD parameter; send at least one first signal to the first communication apparatus; and receive first DPD parameter information from the first communication apparatus, where the first DPD parameter information is determined by the first communication apparatus based on the at least one first signal received by the first communication apparatus and the first DPD parameter information.

In another possible implementation, the DPD model order includes at least one of the following: the non-linear order, the memory depth, and a cross-term length.

A ninth aspect of this application provides a communication apparatus. The communication apparatus includes a processor. The processor is configured to invoke and run a computer program stored in a memory, so that the processor implements any one of the implementations of the first aspect to the fourth aspect.

Optionally, the communication apparatus further includes a transceiver. The processor is further configured to control the transceiver to receive and send a signal.

Optionally, the communication apparatus includes the memory, and the memory stores the computer program.

A tenth aspect of this application provides a computer program product including instructions. When the computer program product runs on a computer, the computer is enabled to perform any one of the implementations of the first aspect to the fourth aspect.

An eleventh aspect of this application provides a computer-readable storage medium, including computer instructions. When the computer instructions are run on a computer, the computer is enabled to perform any one of the implementations of the first aspect to the fourth aspect.

A twelfth aspect of this application provides a chip apparatus, including a processor, configured to connect a memory and invoke a program stored in the memory, to enable the processor to perform any one of the implementations of the first aspect to the fourth aspect.

A thirteenth aspect of this application provides a communication system. The communication system includes the first communication apparatus in the fifth aspect and the second communication apparatus in the sixth aspect; or the communication system includes the first communication apparatus in the seventh aspect and the second communication apparatus in the eighth aspect.

According to the foregoing technical solutions, it can be learned that embodiments of this application have the following advantages.

It can be learned from the foregoing technical solutions that, the first communication apparatus receives the first configuration information from the second communication apparatus, where the first configuration information includes at least one configured resource. Then, the first communication apparatus receives at least one first signal from the second communication apparatus by using the at least one resource. The first communication apparatus measures the at least one first signal received by the first communication apparatus, to obtain the first DPD parameter information. The first communication apparatus sends the first DPD parameter information to the second communication apparatus. It can be learned that in the technical solutions provided in this application, the second communication apparatus may configure the at least one resource for the first communication apparatus by using the first configuration information. The first communication apparatus receives the at least one first signal from the second communication apparatus by using the at least one resource, and measures the at least one first signal to obtain the first DPD parameter information. The first communication apparatus sends the first DPD parameter information to the second communication apparatus, so that the second communication apparatus compensates, based on the first DPD parameter, for the signal non-linear distortion caused by using one or more power amplifiers to send a signal on a second communication apparatus side, to improve the linearity of the signal sent by the second communication apparatus.

DESCRIPTION OF EMBODIMENTS

Figure 1:
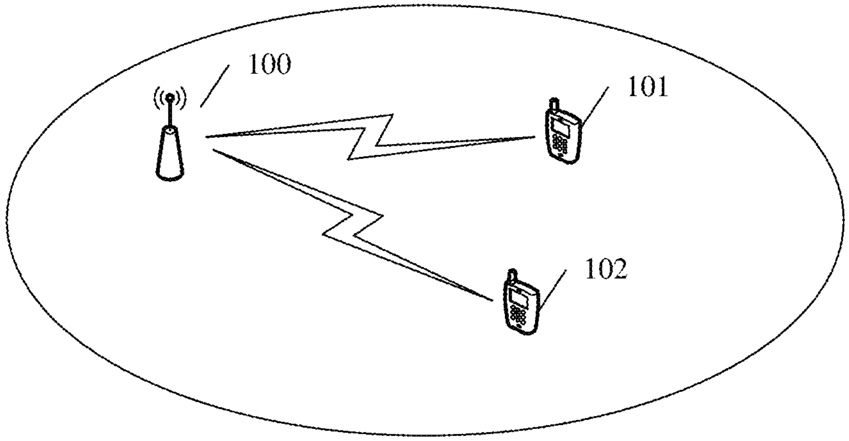
FIG. 1 is a diagram of a communication system according to an embodiment of this application.

Embodiments of this application provide a communication method and a related apparatus, for a second communication apparatus to obtain first DPD parameter information, so that the second communication apparatus compensates, based on the first DPD parameter information, for signal non-linear distortion caused by a plurality of PAs corresponding to a digital channel of the second communication apparatus and linearity of a signal output by the second communication apparatus is improved.

The following clearly describes the technical solutions in embodiments of this application with reference to the accompanying drawings in embodiments of this application. It is clear that the described embodiments are merely a part of but not all of embodiments of this application. All other embodiments obtained by a person skilled in the art based on embodiments of this application without creative efforts shall fall within the protection scope of this application.

Reference to "an embodiment", "some embodiments", or the like described in this application indicates that one or more embodiments of this application include a specific characteristic, structure, or characteristic described with reference to embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "contain", "have", and variations thereof all mean "including but not limited to", unless otherwise specifically emphasized in another manner.

In descriptions of this application, unless otherwise specified, "/" means "or". For example, A/B may represent A or B. A term "and/or" in this specification describes only an association relationship between associated objects and indicates that there may be three relationships. For example, A and/or B may represent the following three cases: Only A exists, both A and B exist, and only B exists. In addition, "at least one" means one or more, and "a plurality of" means two or more. "At least one of the following items (pieces)" or a similar expression thereof indicates any combination of these items, including a single item (piece) or any combination of a plurality of items (pieces). For example, at least one of a, b, or c may indicate a, b, c, a and b, a and c, b and c, or a, b, and c. Each of a, b, and c may be singular or plural.

The technical solutions in embodiments of this application may be applied to various communication systems, for example, a $5^{th}$ generation (5G) system or a new radio (NR) system, a long term evolution (LTE) system, an LTE frequency division duplex (FDD) system, an LTE time division duplex (TDD) system, a universal mobile telecommunications system (UMTS), a mobile communication system after a 5G network (for example, a 6G mobile communication system), and a vehicle to everything (V2X) communication system.

The communication systems to which this application is applicable include a first communication apparatus and a second communication apparatus. The first communication apparatus is a terminal device, and the second communication apparatus is a network device. Alternatively, the first communication apparatus is a network device, and the second communication apparatus is a terminal device. Alternatively, both the first communication apparatus and the second communication apparatus are network devices. Alternatively, both the first communication apparatus and the second communication apparatus are terminal devices. This is not specifically limited in this application. The following mainly describes the technical solutions of this application by using an example in which the first communication apparatus is a terminal device and the second communication apparatus is a network device.

The following describes the terminal device and the network device in this application.

The terminal device may be a wireless terminal device that can receive scheduling and indication information from the network device. The wireless terminal device may be a device that provides a user with voice and/or data connectivity, a handheld device with a wireless connection function, or another processing device connected to a wireless modem.

The terminal device, also referred to as user equipment (UE), a mobile station (MS), a mobile terminal (MT), or the like, is a device including a wireless communication function (that provides a user with voice/data connectivity), for example, the handheld device with the wireless connection function or a vehicle-mounted device. Currently, some examples of terminal devices are: a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in the vehicle to everything, a wireless terminal in self driving, a wireless terminal in remote medical surgery, a wireless terminal in a smart grid, a wireless terminal in transportation safety, a wireless terminal in a smart city, a wireless terminal in a smart home, or the like. For example, the wireless terminal in the vehicle to everything may be a vehicle-mounted device, an entire vehicle device, a vehicle-mounted module, a vehicle, or the like. The wireless terminal in the industrial control may be a camera, a robot, or the like. The wireless terminal in the smart home may be a television, an air conditioner, a sweeper, a speaker, a set-top box, or the like.

The network device may be a device in a wireless network. For example, the network device is a device that is deployed in a radio access network and that provides a wireless communication function for the terminal device. For example, the network device may be a radio access network (RAN) node that connects the terminal device to the wireless network, and may also be referred to as an access network device.

The network device includes but is not limited to: a base transceiver station (BTS) in a global system for mobile communications (GSM) or a code division multiple access (CDMA) network, or may be a NodeB (NB) in a wideband code division multiple access (WCDMA) network, or may be an evolved NodeB (eNB), a radio network controller (RNC), an NB, a base station controller (BSC), a base transceiver station (BTS), a home evolved NodeB (or home NodeB, HNB), a baseband unit (BBU), an access point (AP), a wireless relay node, a wireless backhaul node, a transmission point (TP), or a transmission reception point (TRP) in a wireless fidelity (Wi-Fi) system, or the like, or may be a network device in a 5G mobile communication system. For example, a next generation NodeB (gNB), a transmission reception point (TRP), or a transmission point (TP) in a new radio (NR) system; or one or a group of (including a plurality of antenna panels) antenna panels of a base station in a 5G mobile communication system; or the network device may be a network node that forms a gNB or a transmission point. For example, a baseband unit (BBU) or a distributed unit (DU).

In some deployments, the gNB may include a central unit (CU) and a DU. The gNB may further include an active antenna unit (AAU). The CU implements some functions of the gNB, and the DU implements some functions of the gNB.

For example, the CU is responsible for processing a non-real-time protocol and service, and implements functions of a radio resource control (RRC) layer and a packet data convergence protocol (PDCP) layer. The DU is responsible for processing a physical layer protocol and a real-time service, and implements functions of a radio link control (RLC) layer, a media access control (MAC) layer, and a physical (PHY) layer. The AAU implements some physical layer processing functions, radio frequency processing, and a function related to an active antenna. Information at the RRC layer is finally changed to information at the PHY layer, or is changed from the information at the PHY layer. Therefore, in this architecture, higher layer signaling (for example, RRC layer signaling) may also be considered to be sent by the DU, or sent by the DU and the AAU. It may be understood that the network device may be a device including one or more of a CU node, a DU node, and an AAU node. In addition, the CU may be classified into a network device in an access network (RAN), or the CU may be classified into a network device in a core network (CN). This is not limited in this application.

For ease of understanding embodiments of this application, the following first briefly describes several terms used in this application.

A beam may be represented in an NR protocol as a spatial domain filter, or be referred to as a spatial filter, a spatial domain parameter, a spatial parameter, a spatial domain setting, a spatial setting, quasi-colocation (QCL) information, a QCL assumption, a QCL indication, or the like. The beam may be indicated by a transmission configuration indicator state (TCI-state) parameter or a spatial relationship parameter. Therefore, in this application, the beam may be replaced with a spatial domain filter, a spatial filter, a spatial domain parameter, a spatial parameter, a spatial domain setting, a spatial setting, QCL information, a QCL assumption, a QCL indication, a TCI-state (including an uplink TCI-state or a downlink TCI-state), a spatial relationship, or the like. The foregoing terms are equivalent to each other. Alternatively, the beam may be replaced with another term for representing a beam. This is not limited herein in this application.

A beam used to transmit a signal may be referred to as a transmission beam (Tx beam), or may be referred to as a spatial domain transmission filter, a spatial transmission filter, a spatial domain transmission parameter, a spatial transmission parameter, a spatial domain transmission setting, or a spatial transmission setting. A downlink transmission beam may be indicated by using the TCI-state.

A beam used to receive a signal may be referred to as a reception beam (Rx beam), or may be referred to as a spatial domain reception filter, a spatial reception filter, a spatial domain reception parameter, a spatial reception parameter, a spatial domain reception setting, or a spatial reception setting. An uplink transmission beam may be indicated by the spatial relationship, an uplink TCI-state, or a channel sounding reference signal (SRS) resource (indicating a transmission beam using this SRS). Therefore, the uplink beam may alternatively be replaced with the SRS resource.

The transmission beam may refer to distribution of signal strength formed in different directions in space after a signal is transmitted via an antenna, and the receive beam may refer to distribution of signal strength, in different directions in space, of a radio signal received from an antenna.

In addition, the beam may be a wide beam, a narrow beam, or a beam of another type. A technology for forming the beam may be a beamforming technology or another technology. The beamforming technology may be specifically a digital beamforming technology, an analog beamforming technology, a hybrid digital beamforming technology, a hybrid analog beamforming technology, or the like.

The beam corresponds to configuration information of the reference signal. For example, during beam measurement, the network device may determine quality of different beams based on quality of different reference signals. The terminal device measures the reference signal, and feeds back quality of the reference signal to the network device. The network device may determine quality of the beam based on the quality of the reference signal. For the configuration information of the reference signal, refer to the following related descriptions. During data transmission, the beam information is also indicated by using configuration information of a reference signal corresponding to the beam information. For example, the network device indicates information about a physical downlink shared channel (PDSCH) beam of the terminal device by using a TCI field in downlink control information (DCI). In a possible implementation, a plurality of beams having a same or similar communication characteristic are considered as one beam.

In this application, the resource may be understood as a time-frequency resource that is configured in the configuration information of the reference signal and that is used to carry the reference signal. The following describes the configuration information of the reference signal.

The configuration information of the reference signal includes a related parameter of the reference signal, for example, a sending periodicity and a used time-frequency resource of the reference signal. The reference signal may be an uplink reference signal or a downlink reference signal. The uplink reference signal includes but is not limited to a sounding reference signal (SRS) and a demodulation reference signal (DMRS). The downlink reference signal includes but is not limited to a channel state information-reference signal (CSI-RS), a cell-specific reference signal (CS-RS), a UE-specific reference signal (user equipment-specific reference signal, US-RS), a demodulation reference signal (DMRS), and a synchronization signal/physical broadcast channel block (SS/PBCH block). The SS/PBCH block may be referred to as a synchronization signal block (SSB) for short.

The configuration information of the reference signal may be configured by using RRC signaling. In terms of a configuration structure, the configuration information of the reference signal corresponds to a data structure, and includes a related parameter of an uplink reference signal or a related parameter of a downlink reference signal corresponding to the data structure. For example, for the uplink reference signal, the configuration information of the reference signal includes at least one of the following: a type of the uplink reference signal, a resource granularity (which may also be referred to as a time-frequency resource) for carrying the uplink reference signal, sending time and a sending periodicity of an uplink channel, an antenna port configured to send the uplink reference signal, and the like. For the downlink reference signal, the configuration information of the reference signal includes at least one of the following: a type of the downlink reference signal, a resource granularity (which may also be referred to as a time-frequency resource) for carrying the downlink reference signal, sending time and a sending periodicity of the downlink reference signal, an antenna port configured to send the downlink reference signal, and the like. In this application, the resource may be understood as a time-frequency resource that is configured in the configuration information of the reference signal and that is used to carry the reference signal. Each resource corresponds to a corresponding antenna port, and the antenna port is specifically represented by using the configuration information of the reference signal.

The following describes two possible communication systems to which this application is applicable. This application is also applicable to another communication system. This is not specifically limited in this application.

FIG. 1 is a diagram of a communication system according to an embodiment of this application. Refer to FIG. 1. The communication system includes at least one network device and at least one terminal device. As shown in FIG. 1, there are a network device 100, a terminal device 101, and a terminal device 102. The network device 100 may separately perform communication transmission with the terminal device 101 and the terminal device 102.

Figure 2:
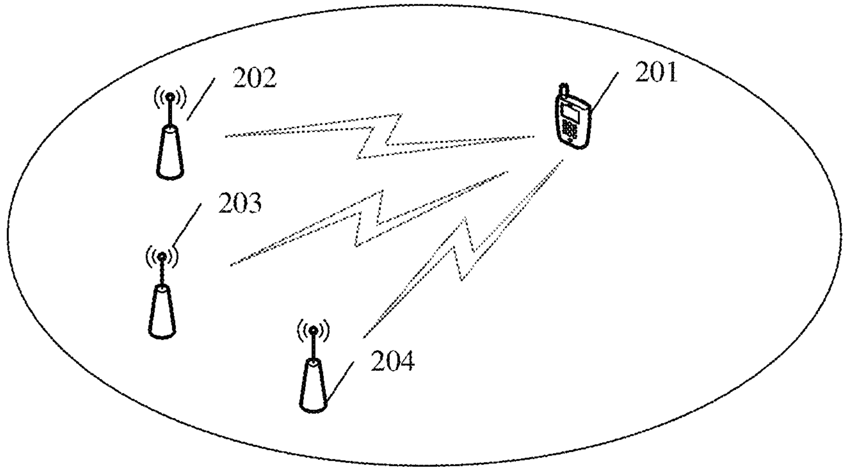
FIG. 2 is another diagram of a communication system according to an embodiment of this application.

FIG. 2 is another diagram of a communication system according to an embodiment of this application. Refer to FIG. 2. The communication system includes at least one network device and at least one terminal device. As shown in FIG. 2, there are a terminal device 201, a network device 202, a network device 203, and a network device 204. The terminal device 201 may perform communication transmission with a plurality of network devices, so that the plurality of network devices provide a communication service for one terminal device.

A PA can amplify a low power signal generated by a network device or a terminal device to a power level that can be used for long-distance transmission, to implement long-distance communication. Therefore, the power amplifier is a core component of a wireless communication device. When the power amplifier amplifies power of a signal, the power amplifier causes non-linear distortion Consequently, a performance indicator of a transmitted signal deteriorates. For example, the non-linear distortion caused by the power amplifier may result in performance degradation of an error vector magnitude and an adjacent channel leakage power ratio of the transmitted signal.

Figure 3:
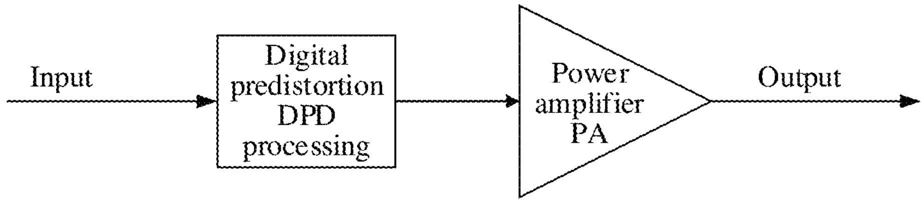
FIG. 3 is a diagram of compensation, through DPD processing, for signal non-linear distortion caused by a PA according to an embodiment of this application.
Figure 4A:
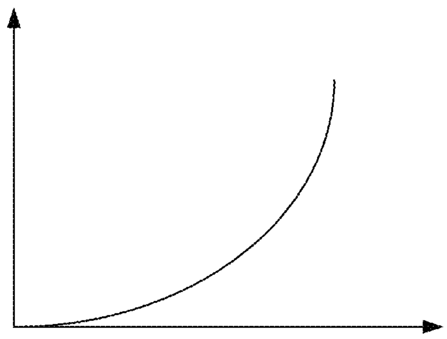
FIG. 4*a* is a diagram of a function of a signal obtained through DPD processing according to an embodiment of this application.
Figure 4B:
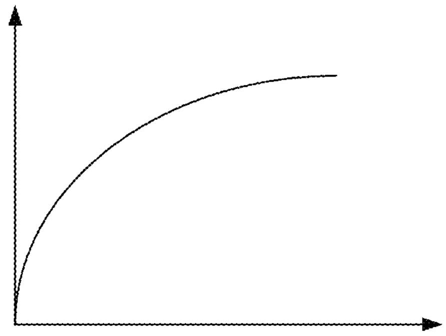
FIG. 4*b* is a diagram of a function of a signal obtained through PA processing according to an embodiment of this application.
Figure 4C:
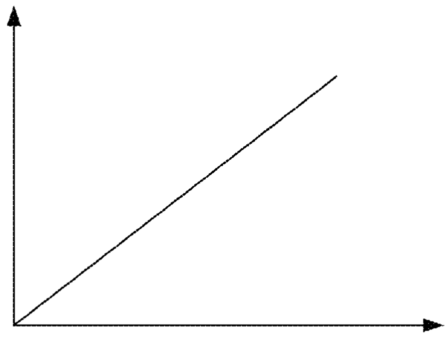
FIG. 4*c* is a diagram of a function of a signal obtained through DPD processing and PA processing according to an embodiment of this application.

A DPD technology is an effective method to improve linearity of an output signal of the power amplifier. A specific principle includes: As shown in FIG. 3, before a signal passes through a power amplifier, DPD processing is first performed on the signal, and then the signal passes through the power amplifier, so that linearity of an output signal is improved. A signal obtained by performing DPD processing on an input signal may be represented by using a function shown in FIG. 4*a*, and a signal obtained by performing PA processing on an input signal may be represented by using a function shown in FIG. 4*b*. Therefore, a signal obtained by performing the DPD processing and the power amplifier processing that are shown in FIG. 3 on an input signal may be represented by using a function shown in FIG. 4*c*.

In a frequency band such as a high frequency band or a millimeter wave, a second communication apparatus uses more antennas to obtain an array gain, to resist a larger propagation loss of a high-frequency signal. For example, in a frequency band from 26 GHz (gigahertz) to 28 GHz, a quantity of elements included in the second communication apparatus may reach hundreds or thousands. To avoid excessively high costs and power consumption caused by a large-scale array, the second communication apparatus may use an analog beamforming (ABF) system architecture or an HBF system architecture. Certainly, the second communication apparatus may alternatively use another system architecture. This is not specifically limited in this application. The following describes the HBF system architecture.

Figure 5:
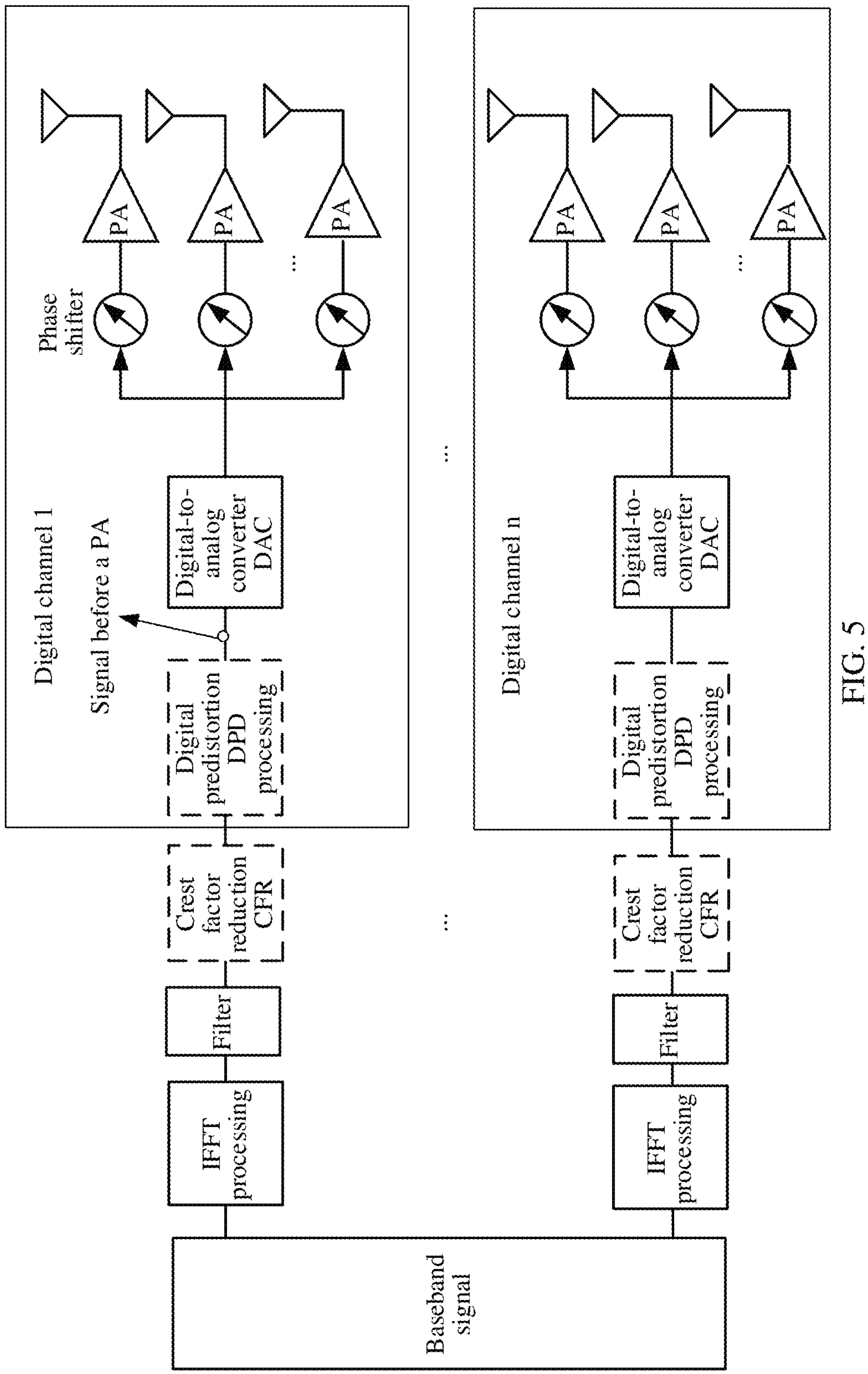
FIG. 5 is a diagram of an architecture of a hybrid beamforming (HBF) system according to an embodiment of this application.

FIG. 5 is a diagram of an HBF system architecture according to an embodiment of this application. As shown in FIG. 5, one or more digital channels exist in a second communication apparatus, each digital channel corresponds to one or more PAs, and each PA is connected to one antenna element. A first communication apparatus may assist the second communication apparatus in obtaining information about a DPD parameter corresponding to each digital channel. In other words, the technical solutions of this application are mainly for an over the air digital predistortion (OTA DPD) scenario, so that a signal is transmitted between the first communication apparatus and the second communication apparatus over an air interface, to obtain a DPD parameter corresponding to a digital channel.

This application is applicable to a scenario in which a coverage capability is strong and energy consumption of a transmitting end is low, such as enhanced mobile broadband (eMBB) and massive machine-type communications (mMTC). It should be noted that a communication system to which this application is applicable is not limited to a cyclic prefix-orthogonal frequency division multiplexing (CP-OFDM) system or a discrete Fourier transform spread orthogonal frequency division multiplexing (DFT-spread-OFDM, DFT-s-OFDM) system. In this application, a time domain symbol may be an OFDM symbol or a DFT-s-OFDM symbol.

Figure 6:
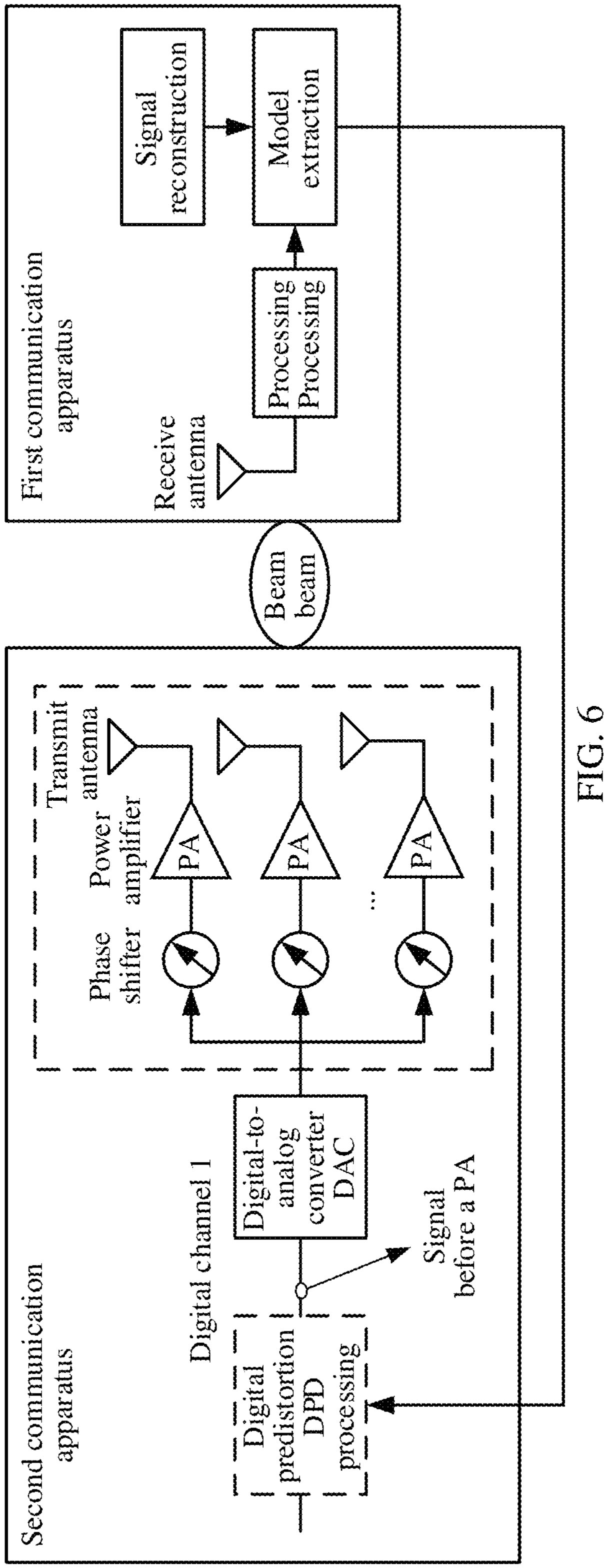
FIG. 6 is a diagram in which a first communication apparatus assists a second communication apparatus in obtaining information about a DPD parameter of a digital channel 1 according to an embodiment of this application.

FIG. 6 is a diagram in which a first communication apparatus assists a second communication apparatus in obtaining information about a DPD parameter of a digital channel 1. Refer to FIG. 6. The digital channel 1 of the second communication apparatus corresponds to a DPD module, a digital-to-analog converter (DAC), a phase shifter, a plurality of PAs, and a plurality of transmit antenna elements (which may also be referred to as transmit antennas). The DPD module is configured to perform DPD processing on a signal. The DAC is configured to convert a digital signal into an analog signal. The first communication apparatus includes a receive antenna, a process module, a signal reconstruction module, and a model extraction module. The process module is configured to perform channel estimation, equalization, measurement signal combination, and the like. The signal reconstruction module is configured to reconstruct a signal before a PA. The model extraction module is configured to determine the information about the DPD parameter corresponding to the digital channel 1. The information about the DPD parameter may be used to compensate for signal non-linear distortion caused by one or more PAs corresponding to the digital channel 1.

It should be noted that, in a process of measurement signal transmission between the first communication apparatus and the second communication apparatus, the DPD processing is not performed on a measurement signal. After the first communication apparatus obtains first DPD parameter information, the first communication apparatus feeds back the first DPD parameter information to the second communication apparatus. When the second communication apparatus sends a data signal, the second communication apparatus may perform the DPD processing on the data signal based on the first DPD parameter information, to achieve advance compensation for the data signal. Then, a compensated data signal is processed by the phase shifter and the PA, and is sent to the first communication apparatus via the transmit antenna.

As described above, in the HBF system architecture, one digital channel of a transmitter corresponds to one or more PAs, and usually corresponds to hundreds to thousands of PAs. In addition, each PA may have a different non-linear characteristic. Because there are excessive PAs, the transmitter in the HBF system architecture usually cannot implement non-linear correction of PAs one by one. An OTA-DPD technology can resolve the foregoing problem. The inventor finds through research that, a non-linear effect of a plurality of PA combined signals may be equivalent to a non-linear effect of a single PA.

Figure 7:
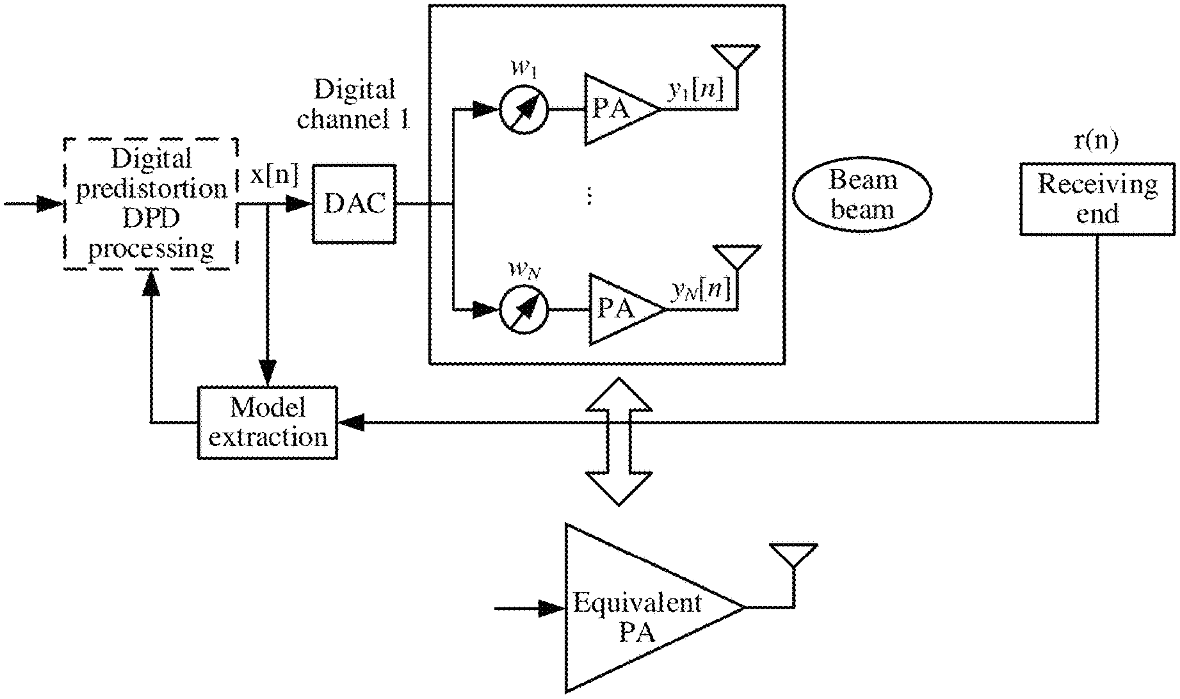
FIG. 7 is a diagram of an equivalent architecture of a digital channel in OTA DPD according to an embodiment of this application.

For example, FIG. 7 is a diagram of an equivalent architecture of a digital channel in OTA-DPD. If a signal before entering the DAC is represented as x[n], the signal before entering the DAC may be referred to as a signal before the PA. An analog beamforming weight vector $w=[w_1, w_2, \ldots]^T$, where the analog beamforming weight vector includes a weight used by the phase shifter corresponding to the digital channel 1. For example, a receiving end device may model the PA by using a memory polynomial (MP). A coefficient of an $i^{th}$ PA is represented by $$a_{k,m}^{(i)},$$

and a signal $y_i[n]$ output by the $i^{th}$ PA may be represented by Formula 1:

$$y_i[n] = \sum_k \sum_m a_{k,m}^{(i)} |w_i|^{2k} w_i |x[n-m]|^{2k} x[n-m] \quad \text{Formula 1}$$

k is a non-linear order used for PA modeling, m is a memory depth used for the PA modeling, and n is a time domain position of a sampling point for performing sampling on the signal before the PA.

A receive antenna of the receiving end device is considered, and r[n] received by the receiving end device may be written as Formula 2:

$$r[n] = \sum_i h_i y_i[n] = \sum_i h_i \sum_k \sum_m a_{k,m}^{(i)} |w_i|^{2k} w_i |x[n-m]|^{2k} x[n-m] = \sum_k \sum_m \gamma_{k,m} |x[n-m]|^{2k} x[n-m] \quad \text{Formula 2}$$

$h_i$ is a channel between an $i^{th}$ antenna in a transmitting end device and a receive antenna of the receiving end device, $$\gamma_{k,m} = \sum_i h_i \beta_{k,m}^{(i)} = \sum_i h_i a_{k,m}^{(i)} |w_i|^{2k} w_i,$$

and it is assumed that an amplitude of the foregoing weight $w_i$ is 1.

It can be learned from Formula 1 and Formula 2 that, at the receiving end device, a plurality of PAs corresponding to one digital channel of the transmitting end device may be equivalent to one PA, and a model coefficient of the equivalent PA is $\gamma_{k,m}$.

It can be learned from the foregoing descriptions that, the transmitting end device may compensate for non-linear effects of all PAs on a single digital channel. Specifically, the receiving end device may feed back, to the transmitting end device, the information about the DPD parameter corresponding to the digital channel. Specifically, the receiving end device receives a signal over an air interface, and determines, based on the received signal, the information about the DPD parameter corresponding to the digital channel. It should be noted that the signal received by the receiving end device is a combination of a plurality of PA amplified signals corresponding to the digital channel, specifically as shown in Formula 2. Therefore, the signal received by the receiving end device includes superposition of the non-linear effects of the plurality of PAs corresponding to the digital channel. Therefore, the receiving end device obtains, based on the received signal, the information about the DPD parameter corresponding to the digital channel, and feeds back the information to the transmitting end device. In this way, the transmitting end device may compensate, based on the information about the DPD parameter corresponding to the digital channel, for signal non-linear distortion caused by the plurality of PAs corresponding to the digital channel.

In this application, at least one first signal in the following embodiments may be referred to as at least one measurement signal, and the DPD processing is not performed on the at least one first signal. At least one resource may be referred to as at least one measurement resource. This is not specifically limited in this application.

The technical solutions of this application are described below with reference to specific embodiments.

Figure 8:
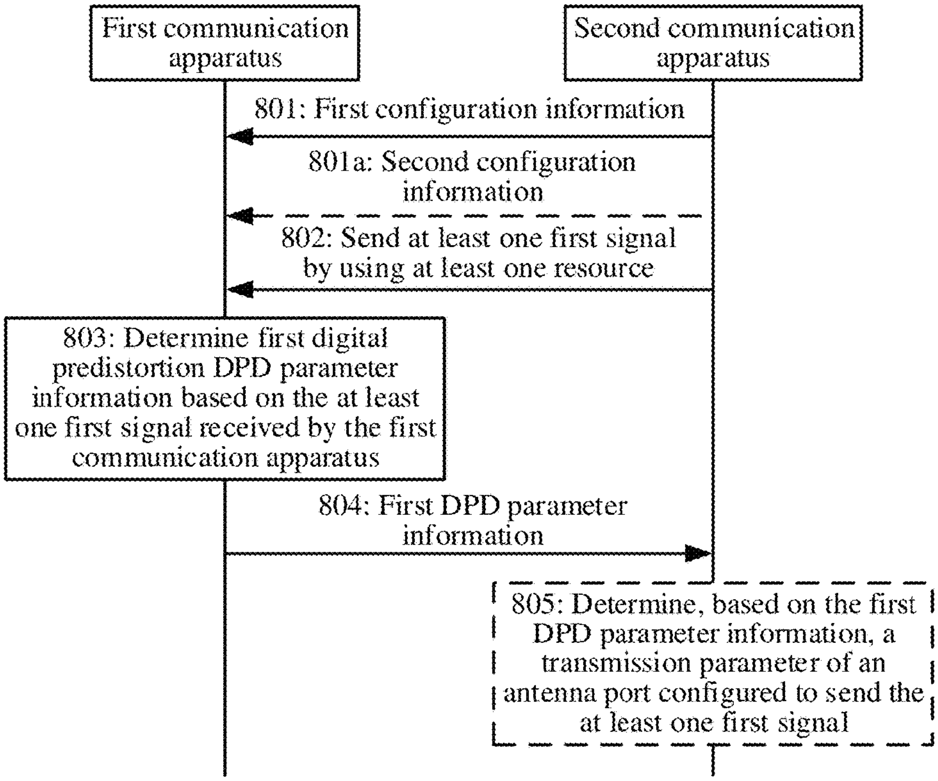
FIG. 8 is a diagram of an embodiment of a communication method according to an embodiment of this application.

FIG. 8 is a diagram of an embodiment of a communication method according to an embodiment of this application. Refer to FIG. 8. The method includes the following steps.

801: A second communication apparatus sends first configuration information to a first communication apparatus. Correspondingly, the first communication apparatus receives the first configuration information from the second communication apparatus.

The first configuration information includes information about at least one resource. Each of the at least one resource corresponds to one antenna port, and different resources correspond to different antenna ports. Each antenna port corresponds to one digital channel, and each digital channel corresponds to one or more PAs. The following uses a first resource as an example for description.

Optionally, the at least one resource includes the first resource, and the first resource corresponds to a first antenna port. In other words, the first resource corresponds to the first antenna port of the second communication apparatus. The first antenna port corresponds to a first digital channel of the second communication apparatus, and the first digital channel corresponds to one or more PAs.

For example, as shown in FIG. 5, the first digital channel is a digital channel 1, and the digital channel 1 corresponds to a plurality of PAs. The second communication apparatus may send a first signal to the first communication apparatus by using the first resource. The first resource includes the first antenna port corresponding to the first resource, and this means that the first signal is sent through the first antenna port. It may also be understood as that the second communication apparatus may process the first signal by using a DAC, a plurality of phase shifters, and a plurality of PAs that correspond to the digital channel 1, and send a processed first signal by using a plurality of transmit antennas corresponding to the digital channel 1. It should be noted that DPD processing corresponding to the digital channel 1 is not performed on the first signal.

Optionally, the first resource may be a periodic resource or a semi-persistent resource. This is not specifically limited in this application.

Optionally, the first resource may include a plurality of measurement resources. Each of the plurality of measurement resources may occupy one or more time domain symbols in time domain. Each of the plurality of measurement resources occupies a channel bandwidth of a to-be-transmitted data signal in frequency domain.

Figure 9:
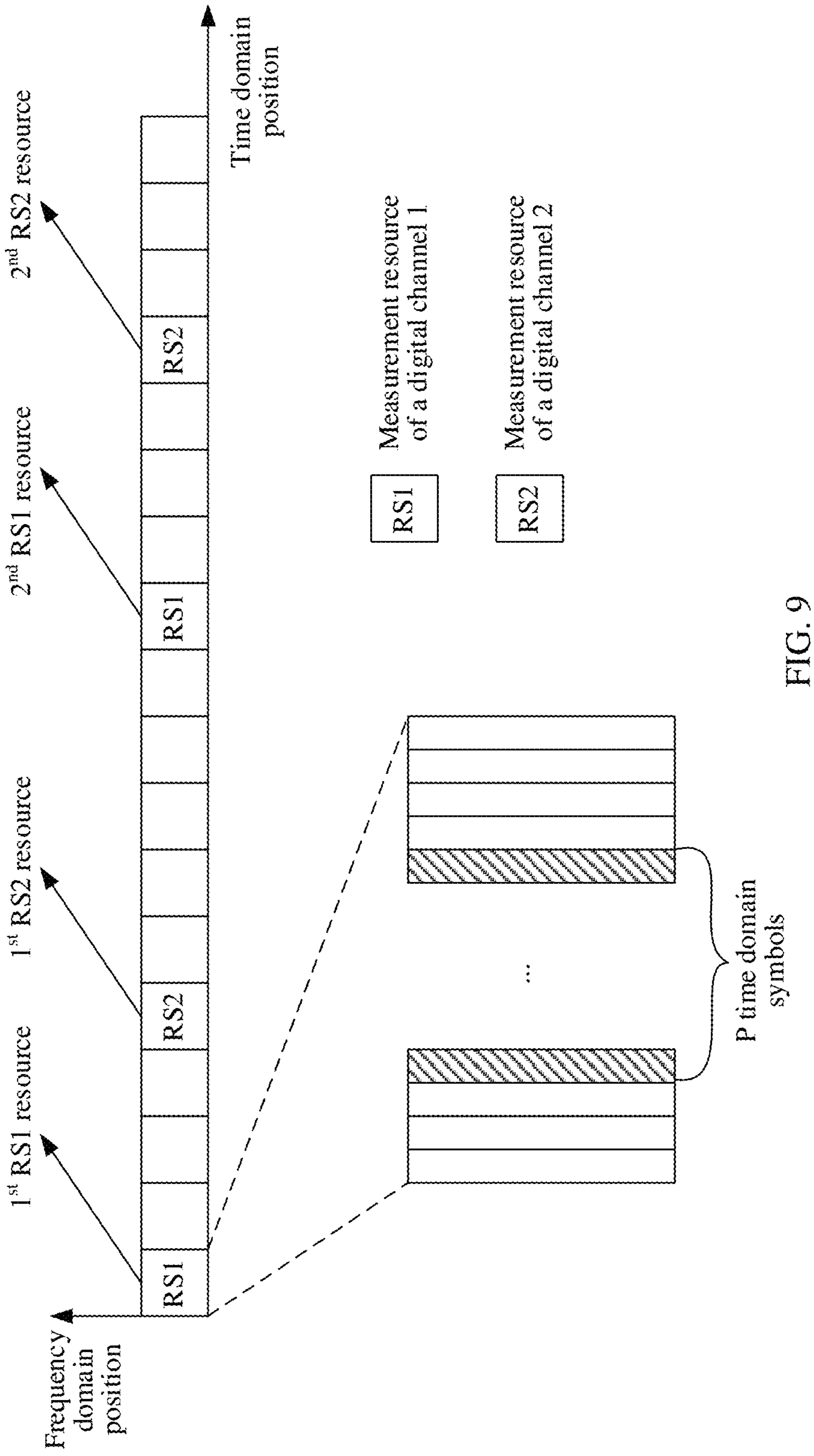
FIG. 9 is a diagram of parallel measurement resources according to an embodiment of this application.

For example, as shown in FIG. 9, the first resource includes measurement resources of a digital channel 1 shown in FIG. 9, and each measurement resource of the digital channel 1 occupies one or more time domain symbols.

Each measurement resource occupies a channel bandwidth of a to-be-transmitted data signal in frequency domain. This helps the second communication apparatus send the first signal in an entire channel bandwidth, and helps the first communication apparatus obtain information about a DPD parameter of the first digital channel in the entire channel bandwidth.

It should be noted that a quantity of time domain symbols occupied by each measurement resource may be determined in consideration of at least one of the following factors: a quantity of fast Fourier transform (FFT) points used when the first communication apparatus performs signal sampling, complexity of training the DPD parameter by the first communication apparatus, and a requirement setting of DPD parameter compensation performance.

For example, when there are a large quantity of FFT points, each measurement resource may occupy one time domain symbol. When there are a small quantity of FFT points, each measurement resource may occupy a plurality of time domain symbols, to ensure DPD parameter training performance.

It should be noted that when each measurement resource occupies a plurality of time domain symbols, the plurality of time domain symbols may be consecutive or inconsecutive. This is not specifically limited in this application. In a scenario in which the plurality of time domain symbols are consecutive, it is convenient for the first communication apparatus to perform the signal sampling and obtain the DPD parameter.

Optionally, the at least one resource further includes a second resource, and the second resource corresponds to a second antenna port. In other words, the second resource corresponds to the second antenna port of the second communication apparatus. The second antenna port corresponds to a second digital channel of the second communication apparatus, and the second digital channel corresponds to one or more PAs.

For example, as shown in FIG. 5, the second digital channel is a digital channel n, and the digital channel n corresponds to a plurality of PAs. The second communication apparatus may send the first signal to the first communication apparatus by using the second resource. The second resource includes the second antenna port corresponding to the second resource, and this means that the second signal is sent through the second antenna port. It may also be understood as that the second communication apparatus may process the first signal by using a DAC, a plurality of phase shifters, and a plurality of PAs that correspond to the digital channel n, and send a processed first signal by using a plurality of transmit antennas corresponding to the digital channel n. It should be noted that DPD processing corresponding to the digital channel n is performed on the first signal.

It should be noted that the foregoing is an implementation in which the second communication apparatus configures the first resource and the second resource by using same configuration information. During actual application, the second communication apparatus may configure the first resource and the second resource by using different configuration information. This is not specifically limited in this application.

Optionally, the second resource may be a periodic resource or a semi-persistent resource. The second resource may include a plurality of measurement resources, each measurement resource may occupy one or more time domain symbols in time domain, and each measurement resource occupies a channel bandwidth of a to-be-transmitted data signal in frequency domain.

For example, as shown in FIG. 9, the second resource includes measurement resources of a digital channel 2 shown in FIG. 9, and each measurement resource of the digital channel 2 occupies one or more time domain symbols. A quantity of time domain symbols occupied by each measurement resource in the second resource is similar to the quantity of time domain symbols occupied by each measurement resource in the first resource. For details, refer to the foregoing related descriptions.

Optionally, a time domain position occupied by the first resource is different from a time domain position occupied by the second resource.

For example, as shown in FIG. 9, the first resource includes the measurement resources of the digital channel 1 shown in FIG. 9, and the second resource includes the measurement resources of the digital channel 2 shown in FIG. 9. It can be learned from FIG. 9 that the first resource and the second resource occupy different time domain positions.

For example, as shown in FIG. 5, the second communication apparatus includes n digital channels. The second communication apparatus configures a corresponding resource for each digital channel. Each resource includes one antenna port, and the antenna port corresponds to the digital channel. Optionally, signals before PAs of different digital channels may be the same or different. The DPD processing is not performed on the signals before PAs. For a case in which the signals before PAs of different digital channels are the same, because non-linear characteristics of equivalent PAs corresponding to different digital channels are different to some extent, signals after PAs obtained through processing by modules (that is, DACs, a plurality of phase shifters, a plurality of PAs, and the like that correspond to the digital channels) corresponding to the different digital channels are also different. Resources configured by the second communication apparatus for digital channels occupy different time domain positions, so that the second communication apparatus sends first signals of different antenna ports in a time-division sending manner. In this way, interference between digital channels corresponding to the different antenna ports is avoided, and deterioration of the DPD parameter training performance is avoided. After the first communication apparatus receives a signal of each antenna port, the first communication apparatus determines a DPD parameter of each antenna port based on the signal of each antenna port. Then, the first communication apparatus may send information about the DPD parameter of each antenna port to the second communication apparatus. The information about the DPD parameter of each antenna port is used to determine a transmission parameter of the antenna port. In other words, the second communication apparatus may subsequently perform the DPD processing on a data signal based on the transmission parameter. In this way, signal non-linear distortion caused by a digital channel corresponding to the antenna port (in other words, signal non-linear distortion caused by a plurality of PAs corresponding to the digital channel) is compensated for in advance.

The second communication apparatus configures the first resource and the second resource for the first communication apparatus. The first resource and the second resource may be parallel measurement resources, or may be serial measurement resources. The following provides descriptions with reference to FIG. 9 and FIG. 10.

1. The first resource and the second resource are parallel measurement resources. It may be understood that the second communication apparatus sends, in a preset period of time, the first signal through the first antenna port by using the first resource and through the second antenna port by using the second resource. In other words, the second communication apparatus sends the first signal through a plurality of antenna ports in the preset period of time. In other words, the second communication apparatus sends, in the preset period of time, measurement resources corresponding to a plurality of digital channels. The measurement resources may be referred to as the parallel measurement resources.

For example, as shown in FIG. 9, the first resource includes the measurement resources of the digital channel 1. The second resource includes the measurement resources of the digital channel 2. RS1 represents the measurement resource of the digital channel 1, and RS2 represents the measurement resource of the digital channel 2. The second communication apparatus sends the first signal to the first communication apparatus through the first antenna port by using a $1^{st}$ RS1 resource. The second communication apparatus sends the first signal to the first communication apparatus through the second antenna port by using a $1^{st}$ RS2 resource. Then, the second communication apparatus sends the first signal to the first communication apparatus again through the first antenna port by using a $2^{nd}$ RS1 resource, and the second communication apparatus sends the first signal to the first communication apparatus again through the second antenna port by using a $2^{nd}$ RS2 resource.

In this implementation, the first communication apparatus can distinguish between measurement resources of different antenna ports. Each measurement resource occupies one or more time domain symbols in a single slot.

It should be noted that, in the example shown in FIG. 9, an example in which the first resource includes two measurement resources and the second resource includes two measurement resources is used for description. During actual application, the first resource includes at least one measurement resource, and the second resource includes at least one measurement resource. This is not specifically limited in this application. The foregoing example does not constitute a limitation on this application.

It should be noted that the foregoing example in FIG. 9 shows a process in which the second communication apparatus sends the first signal through the two antenna ports in the preset period of time. During actual application, the second communication apparatus sends the first signal through at least two antenna ports in a preset period of time. This is not specifically limited in this application.

It should be noted that FIG. 9 shows an example in which the second communication apparatus sends the first signal through the first antenna port and the second antenna port in a cross manner. During actual application, the second communication apparatus may first continuously send the first signal through the first antenna port, and after sending the first signal of the first antenna port, the second communication apparatus then continuously sends the first signal through the second antenna port. This is not specifically limited in this application. In other words, in this implementation, the second communication apparatus sends first signals of a plurality of antenna ports in a preset period of time, and a sending sequence of the first signals of the plurality of antenna ports is not limited.

Figure 14:
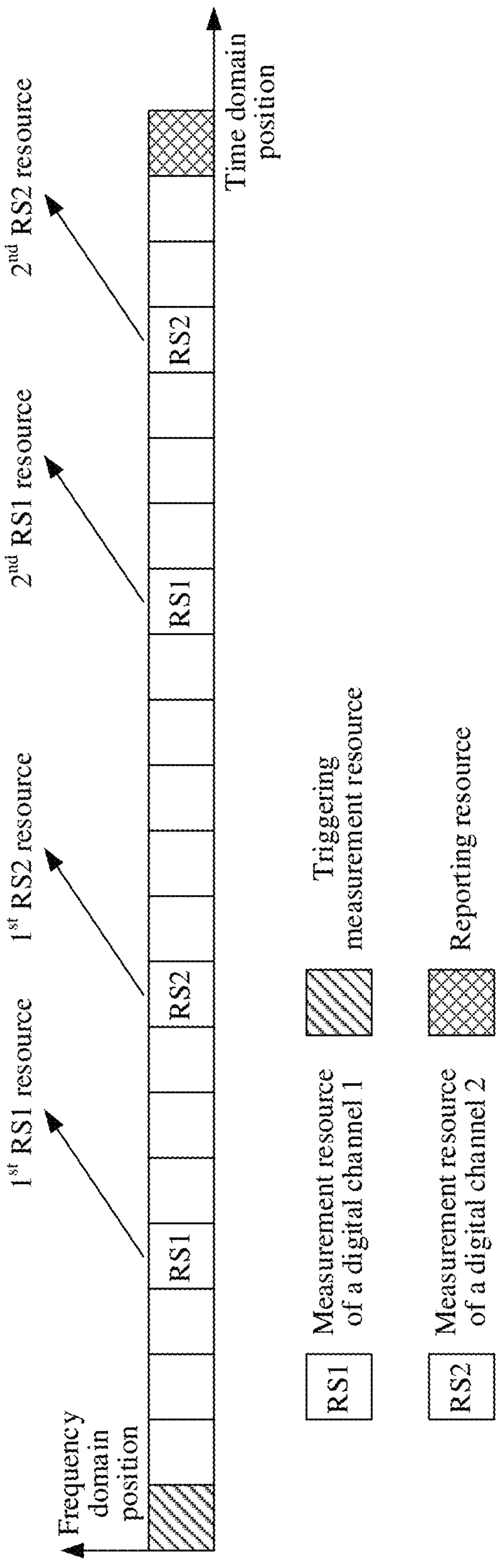
FIG. 14 is a diagram of a triggering resource, a parallel measurement resource, and a reporting resource according to an embodiment of this application.

It should be noted that the preset period of time may be understood as time corresponding to one measurement reporting process in which the second communication apparatus triggers the first communication apparatus to measure the first signal and report the information about the DPD parameter. For example, as shown in FIG. 14, time between a time domain position occupied by a triggering measurement resource and a time domain position occupied by a reporting resource is the preset period of time.

2. The first resource and the second resource are serial measurement resources.

In this implementation, the first resource corresponds to the first antenna port, and the second resource corresponds to the second antenna port. The first antenna port and the second antenna port are a same antenna port. In other words, the first resource and the second resource correspond to the same antenna port. For the first communication apparatus, the first resource and the second resource are a same resource. For ease of description, this implementation is described by using an example in which both the first resource and the second resource correspond to the first antenna port.

It may be understood that, on the first resource, the first antenna port corresponds to the first digital channel, and the second communication apparatus sends the first signal through the first antenna port by using the first resource. In other words, the first signal is a signal obtained through processing by a module corresponding to the first digital channel. In other words, the second communication apparatus sends the first signal through the first digital channel in a preset period of time. In other words, the second communication apparatus sends a measurement resource corresponding to the first digital channel in a preset period of time.

It may be understood that, on the second resource, the first antenna port corresponds to the second digital channel, and the second communication apparatus sends the first signal through the first antenna port by using the second resource. In other words, the first signal is a signal obtained through processing by a module corresponding to the second digital channel. In other words, the second communication apparatus sends the first signal through the second digital channel in another preset period of time. In other words, the second communication apparatus sends a measurement resource corresponding to the second digital channel in another preset period of time.

Figure 10:
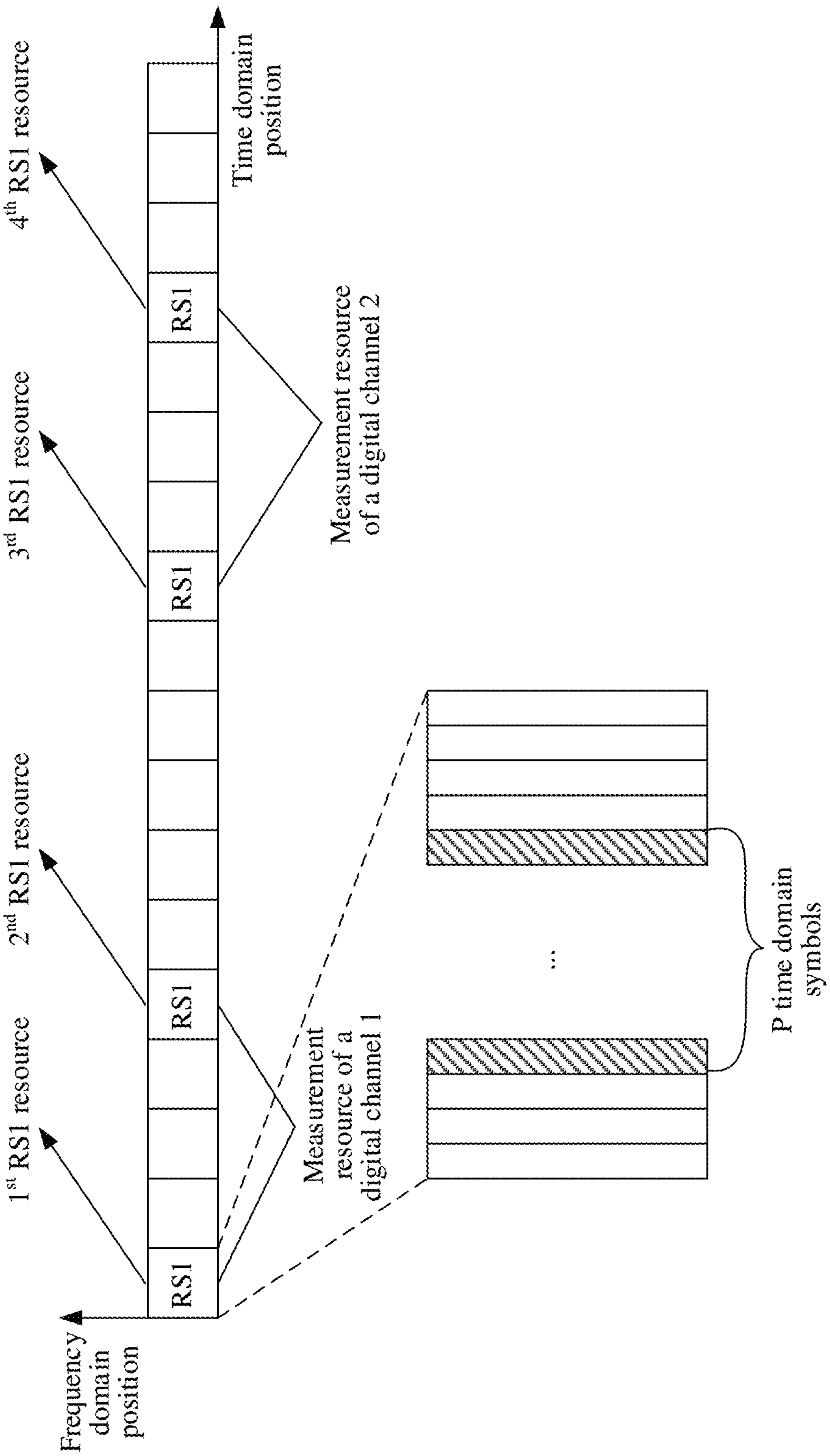
FIG. 10 is a diagram of serial measurement resources according to an embodiment of this application.

For example, as shown in FIG. 10, the first resource includes measurement resources of a digital channel 1, and the second resource includes measurement resources of a digital channel 2. The second communication apparatus sends measurement resources of only one digital channel in a preset period of time. The measurement resources may be referred to as serial measurement resources. As shown in FIG. 10, a plurality of measurement resources of a same digital channel are definitely adjacent. As shown in FIG. 10, the first resource includes a $1^{st}$ RS1 resource and a $2^{nd}$ RS1 resource, and the $1^{st}$ RS1 resource is adjacent to the $2^{nd}$ RS1 resource. The second resource includes a $3^{rd}$ RS1 resource and a $4^{th}$ RS1 resource, and the $3^{rd}$ RS1 resource is adjacent to the $4^{th}$ RS1 resource. Each measurement resource occupies one or more time domain symbols in a single slot.

Figure 15:
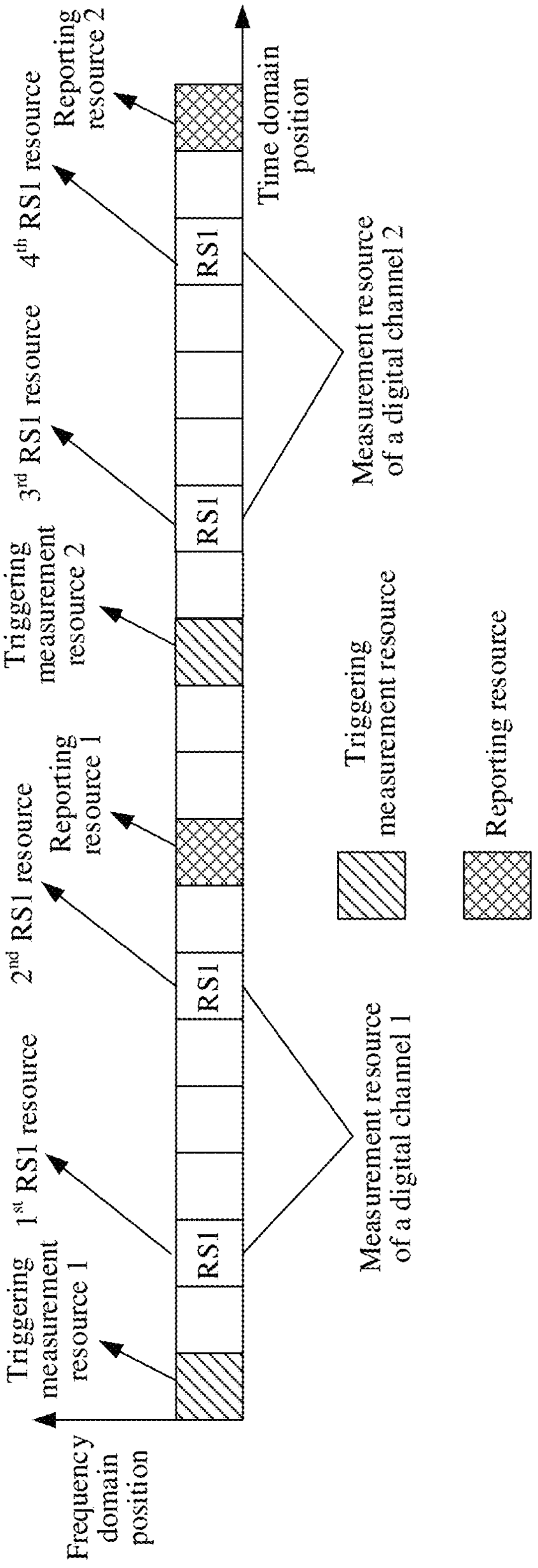
FIG. 15 is a diagram of a triggering resource, a serial measurement resource, and a reporting resource according to an embodiment of this application.

For example, as shown in FIG. 15, the preset period of time may be understood as time between a time domain position occupied by a triggering measurement resource 1 and a time domain position occupied by a reporting resource 1. The another preset period of time may be understood as time between a time domain position occupied by a triggering measurement resource 2 and a time domain position occupied by a reporting resource 2.

Optionally, the first resource corresponds to the first antenna port and a first beam direction. It can be learned from the foregoing related descriptions that the first beam direction corresponds to configuration information of a specific reference signal, and the first resource is a time-frequency resource configured in the configuration information of the reference signal. Therefore, it can be learned that the first resource corresponds to the first beam direction.

Specifically, an antenna subarray connected to each digital channel may form beams in different directions. Model coefficients of equivalent PAs in each beam direction are also different. Therefore, the second communication apparatus needs to provide information about a DPD parameter in a corresponding beam direction for first communication apparatuses in different beam directions. In this way, the second communication apparatus obtains information about a DPD parameter in each beam direction, so that when subsequently providing services for the first communication apparatuses in different beam directions, the second communication apparatus may generate a signal before a PA based on the information about the DPD parameter in the beam direction. This improves linearity of the equivalent PA, improves linearity of an output signal, and enhances a beam coverage capability.

Figure 11:
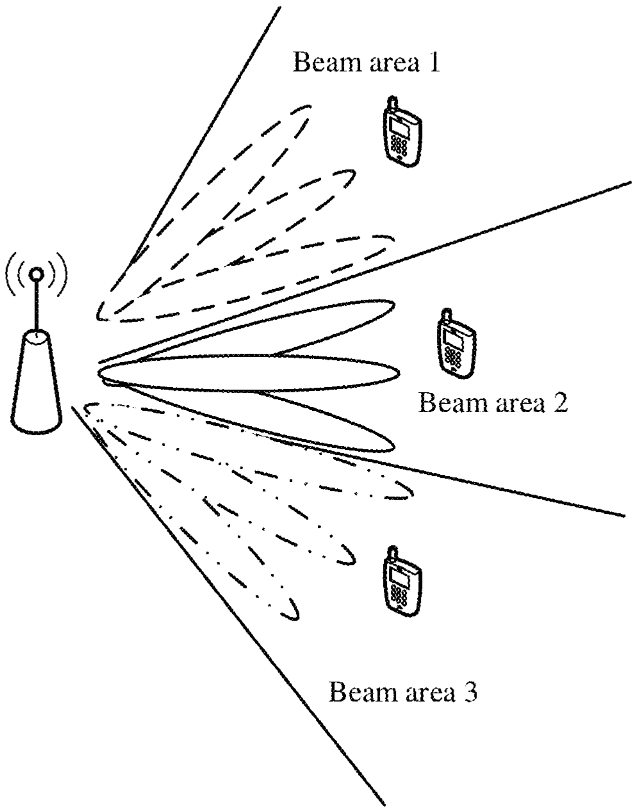
FIG. 11 is a diagram of obtaining information about DPD parameters of a plurality of beam areas by a second communication apparatus according to an embodiment of this application.

For example, as shown in FIG. 11, the second communication apparatus obtains information about DPD parameters corresponding to beam directions one by one on the first digital channel. As shown in FIG. 11, the second communication apparatus may divide three beam areas: a beam area 1, a beam area 2, and a beam area 3. Each beam area may be refined into narrower beams, and a terminal device in the beam area feeds back DPD coefficients of a beam at a plurality of angles. The second communication apparatus may obtain information that is about DPD parameters of corresponding beam areas and that is fed back by a plurality of first communication apparatuses. Therefore, the first communication apparatus is located in the beam area 1, and the first communication apparatus is in the first beam direction. The first communication apparatus may receive, by using the first resource, the first signal that is sent by the second communication apparatus in the first beam direction through the first antenna port. Then, the first communication apparatus determines, based on the first signal, information about a DPD parameter corresponding to the first beam direction, and feeds back the information about the DPD parameter to the second communication apparatus.

It can be learned that this application provides a process of configuring measurement resources corresponding to different digital channels, so that a DPD training procedure in an OTA-DPD scenario can be quickly scheduled and performed in an orderly manner, and mutual interference between different digital channels or different beam directions is avoided to the fullest extent when the first communication apparatus trains DPD parameters corresponding to the different digital channels, to improve the DPD training performance.

In other words, in the technical solution of this application, the second communication apparatus configures measurement resources for digital channels one by one and for beam directions one by one. Different measurement resources occupy different time domain positions, so that interference between subarrays or beam directions corresponding to different digital channels is avoided, and a training effect of a DPD parameter is better. In this way, high matching between DPD training and DPD application is ensured.

Optionally, the embodiment shown in FIG. 8 further includes step 801*a*. It should be noted that step 801*a* may be performed before step 803. There is no fixed execution sequence between step 801*a*, step 801 and step 802. Step 801*a* may be first performed, and then step 801 and step 802 are performed; or step 801 and step 802 may be first performed, and then step 801*a* is performed; or step 801*a*, step 801, and step 802 are simultaneously performed depending on a case. This is not specifically limited in this application.

801*a*: The second communication apparatus sends second configuration information to the first communication apparatus. Correspondingly, the first communication apparatus receives the second configuration information from the second communication apparatus.

The second configuration information is used to configure at least one of the following: a DPD parameter reporting format, a DPD model type used by the first communication apparatus to calculate a DPD parameter, a DPD model order, and a DPD model bandwidth.

Optionally, the DPD parameter model type includes a polynomial model, a memory polynomial model, and a generalized memory polynomial (GMP) model.

The DPD model order includes at least one of the following: the non-linear order, the memory depth, and a cross-term length.

Each DPD parameter model corresponds to a different DPD model order, and is represented by using a model parameter modelParameters={K M G} below, where K represents a highest non-linear order, M represents a memory depth, and G represents a cross-term length. The model order needs to match the model type. For the polynomial model, M=G=0. For the memory polynomial model, G=0. For the generalized memory polynomial model, K, M, and G are all not zero.

The following describes expressions of the plurality of models from a perspective of a DPD module corresponding to the first digital channel.

The polynomial model may be represented by Formula 3:

$$x(n)=\sum_{k=0}^{K-1}c_k|r(n)|^k r(n) \quad \text{Formula 3}$$

x(n) represents a signal output by the DPD module, $c_k$ is a model coefficient of the polynomial model, and r(n) represents a signal input to the DPD module.

The memory polynomial model may be represented by Formula 4:

$$x(n)=\sum_{k=0}^{K-1}\sum_{m=0}^{M-1}c_{km}|r(n-m)|^{k}r(n-m) \quad \text{Formula 4}$$

x(n) represents a signal output by the DPD module, $c_{km}$ is a model coefficient of the polynomial model, and r(n−m) represents a signal input to the DPD module.

The generalized memory polynomial model may be represented by Formula 5:

$$x(n)=\sum_{k=0}^{K-1}\sum_{m=0}^{M-1}c_{km}|r(n-m)|^{k}r(n-m)+\sum_{k=0}^{K-1}\sum_{m=0}^{M-1}\sum_{g=0}^{G}\left[a_{kmg}|r(n-m)|^{k}r(n-m-g)+b_{kmg}|r(n-m)|^{k}r(n-m+g)\right] \quad \text{Formula 5}$$

x(n) represents a signal output by the DPD module, $c_{km}$, $a_{kmg}$, and $b_{kmg}$ are model coefficients of the generalized memory polynomial model, and r(n−m) represents a signal input to the DPD module.

Optionally, the second communication apparatus may directly indicate the DPD model type to the first communication apparatus. Alternatively, the second communication apparatus may indicate the DPD model order to the first communication apparatus, and indirectly indicate the DPD model type based on the DPD model order.

For example, in the DPD model order indicated by the second communication apparatus to the first communication apparatus, M=G=0. In this case, the second communication apparatus may determine that the DPD model is the polynomial model. For example, in the DPD model order indicated by the second communication apparatus to the first communication apparatus, G=0. In this case, the second communication apparatus may determine that the DPD model is the memory polynomial model. For example, in the DPD model order indicated by the second communication apparatus to the first communication apparatus, K, M, and G are all not zero. In this case, the second communication apparatus may determine that the DPD model is the generalized memory polynomial model.

The DPD model bandwidth may be understood as a bandwidth used by the second communication apparatus to send the first signal. For DPD parameter training performed by the first communication apparatus, the bandwidth used by the second communication apparatus to send the first signal is a piece of important information. Because spectrum broadening occurs after the first signal passes through a PA corresponding to a digital channel, a spectrum is usually broadened by three to five times. To provide a training effect of the DPD parameter, the first communication apparatus needs to fully obtain out-of-band information of each measurement resource. Therefore, a sampling rate and a sampling bandwidth of the first communication apparatus need to meet a specific requirement. However, to control an algorithm and costs, the DPD model bandwidth may be agreed on between the second communication apparatus and the first communication apparatus, and may be specifically indicated by the second communication apparatus to the first communication apparatus by using the second configuration information. For example, a value of the DPD model bandwidth is $30.72e^{6}\times[1, 2, 4, 8, 16, 32, 64]$ sps (samples per second (sps)). The second communication apparatus may send the first signal for a plurality of times with reference to the DPD model bandwidth and the sampling bandwidth of the first communication apparatus. In other words, the first resource includes a plurality of measurement resources, and the second communication apparatus sends the first signal by using all the plurality of measurement resources. This helps the first communication apparatus obtain in-band information of the measurement resource and out-of-band information of the measurement resource by measuring the first signal for a plurality of times, so that the first communication apparatus determines the DPD parameter with reference to the in-band information and the out-of-band information.

Figure 12A:
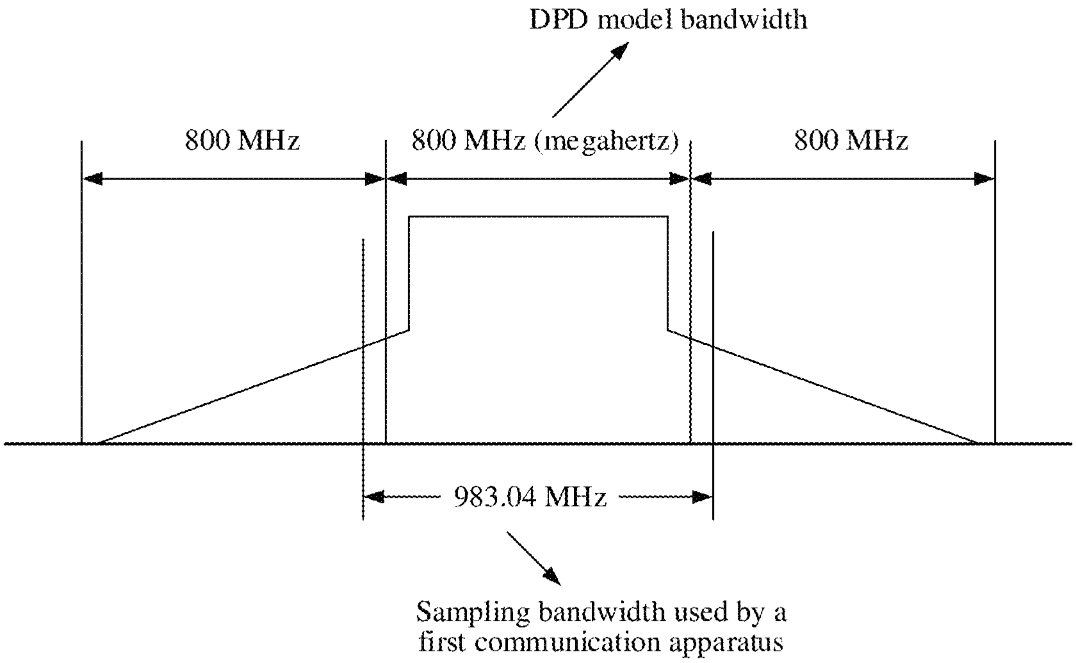
FIG. 12*a* is a diagram of spectrum broadening of a DPD model bandwidth according to an embodiment of this application.
Figure 12B:
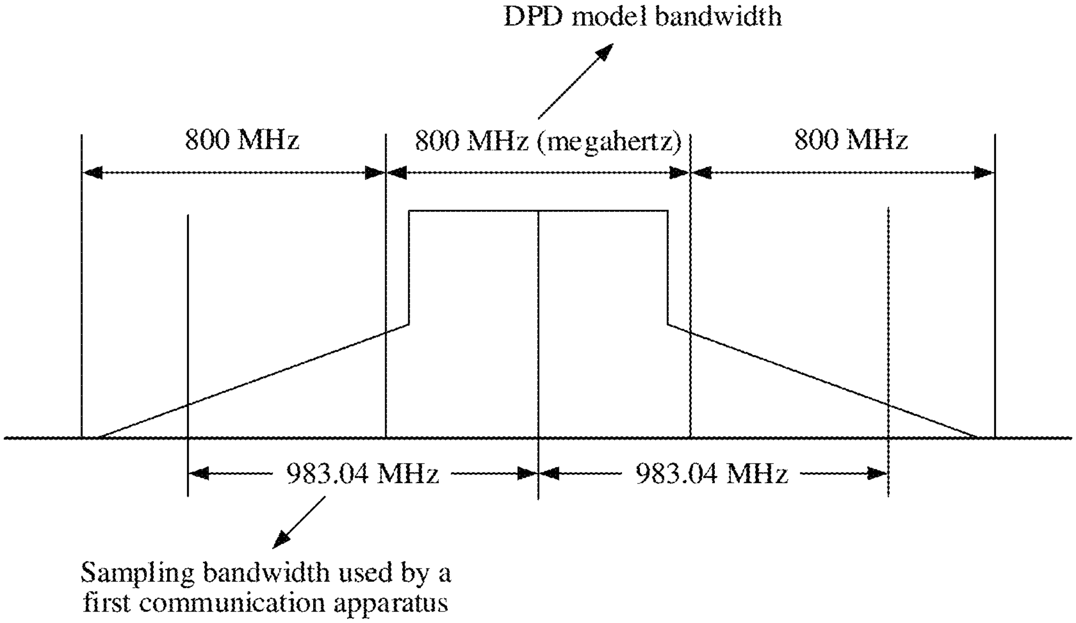
FIG. 12*b* is a diagram of measuring a first signal by a first communication apparatus according to an embodiment of this application.

For example, as shown in FIG. 12*a*, the DPD model bandwidth is 800 MHz (megahertz). The first signal undergoes three to five times spectrum broadening after passing through the PA corresponding to the digital channel, where an example in which the first signal undergoes three times spectrum broadening after passing through the PA corresponding to the digital channel is used herein for description. Therefore, the first signal occupies a bandwidth of 2400 MHz. The sampling bandwidth of the first communication apparatus is 983.04 MHz. Therefore, the second communication apparatus may send the first signal for a plurality of times on the 800 MHz DPD model bandwidth. The first communication apparatus may adjust a center frequency for sampling, so that the first communication apparatus performs sampling on a received signal by using different center frequencies, to obtain information about the first signal in 2400 MHz. For example, as shown in FIG. 12*b*, the second communication apparatus sends the first signal to the first communication apparatus by using one measurement resource in the first resource. The first communication apparatus may set the center frequency to 491.51 MHz. The first communication apparatus performs sampling on the received first signal by using the center frequency 491.51 MHz, to obtain a first sampling signal. The second communication apparatus sends the first signal to the first communication apparatus again by using another measurement resource in the first resource. The first communication apparatus adjusts the center frequency to −491.51 MHz. The first communication apparatus performs sampling on the received first signal by using the center frequency −491.51 MHz, to obtain a second sampling signal. Then, the first communication apparatus combines the first sampling signal and the second sampling signal in frequency domain to obtain a second signal. The first communication apparatus determines a DPD parameter of the first antenna port based on the second signal.

The DPD parameter reporting format indicates a reporting requirement for a non-linear order and a memory depth in the DPD parameter.

Specifically, the second communication apparatus may indicate a corresponding DPD parameter reporting format to the first communication apparatus based on non-linear strength and memory strength of one or more PAs corresponding to the digital channel. For example, stronger non-linear strength of the one or more PAs corresponding to the digital channel indicates stronger memory strength. In this case, the second communication apparatus may configure the first communication apparatus to report more terms corresponding to both the non-linear strength and the memory strength in the DPD parameter. Weaker non-linear strength of the one or more PAs corresponding to the digital channel indicates weaker memory strength. In this case, the second communication apparatus may configure the first communication apparatus to report fewer terms corresponding to both the non-linear strength and the memory strength in the DPD parameter.

The following describes several possible DPD parameter reporting formats by using an example in which k is equal to 3 and m is equal to 3 in the memory polynomial model. Specifically, FIG. 13*a* to FIG. 13*d* show four possible DPD parameter reporting patterns. Cim represents that the non-linear order is k, and the memory depth is a DPD training coefficient corresponding to m.

Figure 13A:
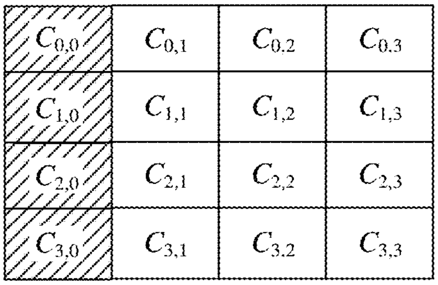
FIG. 13*a* is a diagram of a DPD parameter reporting format according to an embodiment of this application.
Figure 13B:
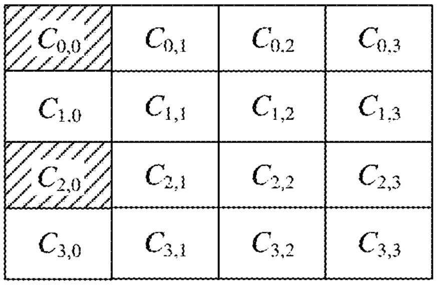
FIG. 13*b* is another diagram of a DPD parameter reporting format according to an embodiment of this application.
Figure 13C:
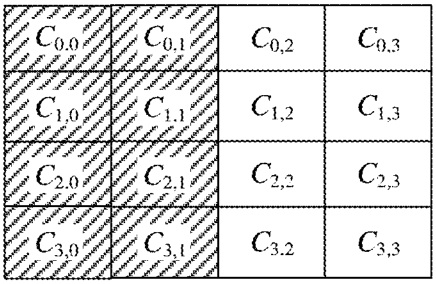
FIG. 13*c* is another diagram of a DPD parameter reporting format according to an embodiment of this application.
Figure 13D:
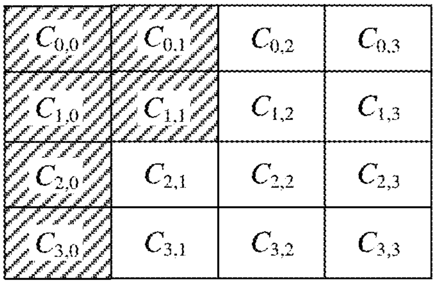
FIG. 13*d* is another diagram of a DPD parameter reporting format according to an embodiment of this application.

First, FIG. 13*a* is used as an example to describe meanings respectively represented by a first column to a fourth column in FIG. 13*a* and meanings respectively represented by a first row to a fourth row in FIG. 13*a*. The first column indicates a 0th-order memory depth, that is, a memory depth 0. A second column indicates a first-order memory depth, that is, a memory depth 1. A third column indicates a second-order memory depth, that is, a memory depth 2. The fourth column indicates a fourth-order memory depth, that is, a memory depth 3. The first row indicates first-order non-linear strength, that is, non-linear strength 1. A second row indicates second-order non-linear strength, that is, non-linear strength 2. A third row indicates third-order non-linear strength, that is, non-linear strength 3. The fourth row indicates fourth-order non-linear strength, that is, non-linear strength 4. FIG. 13*b* to FIG. 13*d* are similar.

When the PA corresponding to the digital channel has no memory or has a weak memory, the second communication apparatus may configure a DPD parameter reporting format shown in FIG. 13*a* or FIG. 13*b*. In addition, the DPD parameter reporting format shown in FIG. 13*a* indicates that non-linear strength of the PA corresponding to the digital channel is strong, and a reporting format of full-order non-linear strength needs to be configured. The DPD parameter reporting format shown in FIG. 13*b* indicates that non-linear strength of the PA corresponding to the digital channel is low, and a reporting format of only two-order non-linear strength needs to be configured.

When the PA corresponding to the digital channel has memorability, the second communication apparatus may configure a DPD parameter reporting format shown in FIG. 13*c* or FIG. 13*d*. In addition, the DPD parameter reporting format shown in FIG. 13*c* indicates that all coefficients of the memory depth 0 and the memory depth 1 are reported. The DPD parameter reporting format shown in FIG. 13*d* indicates that not all coefficients of the memory depth 0 and the memory depth 1 are reported. FIG. 13*d* may be understood as a DPD parameter reporting format that may be used in a scenario in which the non-linear strength of the PA corresponding to the digital channel is weak.

It should be noted that the second communication apparatus may configure a corresponding DPD parameter reporting format for each digital channel. Different digital channels may correspond to different DPD parameter reporting formats, or different digital channels may correspond to a same DPD parameter reporting format. This is not specifically limited in this application. During actual application, the second communication apparatus may determine, with reference to the non-linear strength and the memory depth of the PA corresponding to the digital channel, the DPD parameter reporting format corresponding to each digital channel.

It can be learned that the second communication apparatus may configure the DPD parameter reporting format for the first communication apparatus, so that the first communication apparatus reports a part of DPD parameters with reference to the DPD parameter reporting format, to reduce system overheads.

Optionally, the second communication apparatus indicates, by using the DPD parameter reporting format, the first communication apparatus to report odd numbered-order non-linear strength and an odd numbered-order memory depth; or the second communication apparatus indicates, by using the DPD parameter reporting format, the first communication apparatus to report odd/even numbered-order non-linear strength and an odd/even numbered-order memory depth.

Usually, an odd numbered-order non-linear strength and an odd numbered-order memory depth may reflect most non-linear characteristics of an equivalent PA corresponding to a digital channel. Therefore, the second communication apparatus may indicate the first communication apparatus to report the odd numbered-order non-linear strength and the odd numbered-order memory depth, to reduce system reporting overheads.

Optionally, the second communication apparatus generates the second configuration information based on at least one of the following factors: a non-linear characteristic of one or more PAs corresponding to the digital channel, a performance requirement of communication transmission, resource overheads needed for the DPD parameter training, and overheads for reporting the DPD parameter. It can be learned that a DPD parameter reporting format, a DPD model type, and a DPD model order that are configured by the second communication apparatus for each digital channel are associated with each other.

It should be noted that the foregoing step 801*a* shows an implementation in which the second communication apparatus configures, by using the second configuration information, the reported DPD-related information. During actual application, the information configured by using the second configuration information may alternatively be predefined in a communication protocol. This is not specifically limited in this application.

It should be noted that the second communication apparatus configures corresponding DPD-related information (a DPD parameter reporting format, a DPD model type, a DPD model order, and a DPD model bandwidth) for each digital channel, and different digital channels may use different DPD-related information. Alternatively, the second communication apparatus configures same DPD-related information for all digital channels. This is not specifically limited in this application. During actual application, the second communication apparatus may configure DPD-related information for each digital channel with reference to the non-linear characteristic of the one or more PAs corresponding to each digital channel and an actual requirement.

It can be learned that the second communication apparatus may define the DPD-related information such as the DPD model type, the DPD model order, and the DPD model bandwidth for the digital channel. It is ensured that DPD-related information used by a receiving end and DPD-related information used by a transmitting end are unified, so that DPD parameter training efficiency is improved, and OTA-DPD is more suitable for an actual application scenario.

802: The second communication apparatus sends at least one first signal to the first communication apparatus by using the at least one resource. Correspondingly, the first communication apparatus receives the at least one first signal from the second communication apparatus by using the at least one resource.

Optionally, the at least one first signal is at least one reference signal configured for the at least one resource. For the reference signal, refer to related descriptions of the reference signal configured for the resource.

Optionally, the at least one resource includes the first resource, and the second communication apparatus sends the first signal to the first communication apparatus by using the first resource. The first signal is sent through the first antenna port of the second communication apparatus. The first antenna port corresponds to the first digital channel, and the first digital channel corresponds to one or more PAs. In other words, the first signal is obtained through processing by the one or more PAs corresponding to the first digital channel.

Optionally, the at least one resource includes the second resource, and the second communication apparatus sends the first signal to the first communication apparatus by using the second resource. The first signal is sent through the second antenna port of the second communication apparatus. The second antenna port corresponds to the second digital channel, and the second digital channel corresponds to one or more PAs. In other words, the first signal is obtained through processing by the one or more PAs corresponding to the second digital channel.

For example, as shown in FIG. 14, based on the foregoing parallel measurement resource configuration manner, the second communication apparatus sends first trigger information to the first communication apparatus by using the triggering measurement resource. The first trigger information is used to trigger the first communication apparatus to start signal measurement and perform DPD parameter training. The second communication apparatus sends the first signal to the first communication apparatus through the first antenna port by using the $1^{st}$ RS1 resource. The second communication apparatus sends the first signal to the first communication apparatus through the second antenna port by using the $1^{st}$ RS2 resource. Then, the second communication apparatus sends the first signal to the first communication apparatus again through the first antenna port by using the $2^{nd}$ RS1 resource, and the second communication apparatus sends the first signal to the first communication apparatus again through the second antenna port by using the $2^{nd}$ RS2 resource.

For example, as shown in FIG. 15, based on the foregoing serial measurement resource configuration manner, the second communication apparatus sends second trigger information to the first communication apparatus by using the triggering measurement resource 1. The second trigger information is used to trigger the first communication apparatus to start signal measurement and perform DPD parameter training. The second communication apparatus sends the first signal to the first communication apparatus through the first antenna port by using the $1^{st}$ RS1 resource. The second communication apparatus sends the first signal to the first communication apparatus through the first antenna port by using the $2^{nd}$ RS1 resource. The $1^{st}$ RS1 resource and the $2^{nd}$ RS1 resource are resources included in the first resource, and the first resource corresponds to the first antenna port. On the first resource, the first antenna port corresponds to the first antenna port.

After the second communication apparatus sends the first signal carried on the first resource, the second communication apparatus sends third trigger information to the first communication apparatus by using a triggering resource 2. The third trigger information is used to trigger the first communication apparatus to start the signal measurement and perform the DPD parameter training. The second communication apparatus sends the first signal to the first communication apparatus through the second antenna port by using the $3^{rd}$ RS1 resource. The second communication apparatus sends the first signal to the first communication apparatus again through the second antenna port by using the $4^{th}$ RS1 resource. The $3^{rd}$ RS1 resource and the $4^{th}$ RS1 resource are resources included in the second resource. The second resource and the first resource correspond to a same antenna port, that is, the first antenna port. On the second resource, the first antenna port corresponds to the second digital channel.

803: The first communication apparatus determines the first DPD parameter information based on the at least one first signal received by the first communication apparatus.

For example, as shown in FIG. 14, in the foregoing parallel measurement resource configuration manner, the first communication apparatus receives the first trigger information from the second communication apparatus. The first trigger information is used to trigger the first communication apparatus to start the signal measurement and perform the DPD parameter training. The first communication apparatus starts the signal measurement and performs the DPD parameter training. The first communication apparatus receives the first signal from the second communication apparatus by using the $1^{st}$ RS1 resource. The first communication apparatus receives the first signal from the second communication apparatus by using the $1^{st}$ RS2 resource. The first communication apparatus receives the first signal from the second communication apparatus by using the $2^{nd}$ RS1 resource. The first communication apparatus receives the first signal from the second communication apparatus by using the $2^{nd}$ RS2 resource. The second communication apparatus may determine that the $1^{st}$ RS1 resource and the $2^{nd}$ RS1 resource correspond to the first antenna port. The first antenna port corresponds to the first digital channel. Therefore, the first communication apparatus determines, by using first signals received on the 1 st RS1 resource and the $2^{nd}$ RS1 resource, the DPD parameter corresponding to the first antenna port, that is, the DPD parameter of the first digital channel corresponding to the first antenna port. The second communication apparatus may determine that the $1^{st}$ RS2 resource and the $2^{nd}$ RS2 resource correspond to the second antenna port. Therefore, the first communication apparatus corresponds to the second antenna port by using the $1^{st}$ RS2 resource and the $2^{nd}$ RS2 resource. The second antenna port corresponds to the second digital channel. Therefore, the first communication apparatus determines, by using first signals received on the $1^{st}$ RS2 resource and the $2^{nd}$ RS2 resource, the DPD parameter corresponding to the second antenna port, that is, the DPD parameter of the second digital channel corresponding to the second antenna port. Then, the first communication apparatus may report the information about the DPD parameter corresponding to the first antenna port and the information about the DPD parameter corresponding to the second antenna port together to the second communication apparatus by using a reporting resource.

It can be learned that the first communication apparatus determines one set of DPD parameters by using a first signal received on a resource corresponding to the first antenna port, and determines another set of DPD parameters by using a first signal received on a resource corresponding to the second antenna port. In this way, a plurality of sets of DPD parameters are obtained through training in a period of time, and are reported to the second communication apparatus. This helps improve DPD parameter training efficiency.

For example, as shown in FIG. 15, based on the foregoing serial measurement resource configuration manner, the first communication apparatus receives the second trigger information from the second communication apparatus. The second trigger information is used to trigger the first communication apparatus to start the signal measurement and perform the DPD parameter training. The first communication apparatus starts the signal measurement and performs the DPD parameter training. Specifically, the second communication apparatus determines a training sequence of DPD parameters corresponding to different digital channels. As shown in FIG. 15, the first communication apparatus receives the first signal from the second communication apparatus by using the $1^{st}$ RS1 resource. The first communication apparatus receives the first signal from the second communication apparatus by using the $2^{nd}$ RS1 resource. In other words, the second communication apparatus first sends, through the first antenna port, the first signal on the RS1 resource included in the first resource. Then, the first communication apparatus determines, based on the first signal received by using the first resource, the DPD parameter corresponding to the first antenna port. The first resource corresponds to the first antenna port. On the first resource, the first antenna port corresponds to the first digital channel. The first communication apparatus reports, by using the reporting resource 1, the information about the DPD parameter corresponding to the first antenna port.

After the second communication apparatus receives the DPD parameter corresponding to the first antenna port, the second communication apparatus sends the third trigger information to the first communication apparatus by using the triggering measurement resource 2. The third trigger information is used to trigger the first communication apparatus to re-start the signal measurement and perform the DPD parameter training. The first communication apparatus starts the signal measurement and performs the DPD parameter training. The first communication apparatus receives the first signal from the second communication apparatus by using the $3^{rd}$ RS1 resource and the $4^{th}$ RS1 resource. The first communication apparatus determines, based on the first signal received by using the second resource, the DPD parameter corresponding to the first antenna port. The second resource also corresponds to the first antenna port. On the second resource, the first antenna port corresponds to the second digital channel. The first communication apparatus reports, by using the reporting resource 2, the information about the DPD parameter corresponding to the first antenna port.

It can be learned that the first communication apparatus does not need to determine an antenna port corresponding to a measurement resource, and train and report a set of corresponding DPD parameters in a period of time. This avoids a problem of a digital channel positioning error caused by simultaneous training of a plurality of sets of DPD parameters, so that a training rule is simpler.

Optionally, based on the foregoing step 801*a*, the foregoing step 803 specifically includes:

The first communication apparatus determines the first DPD parameter information based on the at least one first signal received by the first communication apparatus and the second configuration information.

For example, the first communication apparatus determines the DPD model order, the DPD model type, and the DPD model bandwidth based on the second configuration information. Then, the first communication apparatus determines the first DPD parameter information based on the at least one first signal received by the first communication apparatus, and the DPD model order, the DPD model type, and the DPD model bandwidth that are configured by using the second configuration information.

Figure 16:
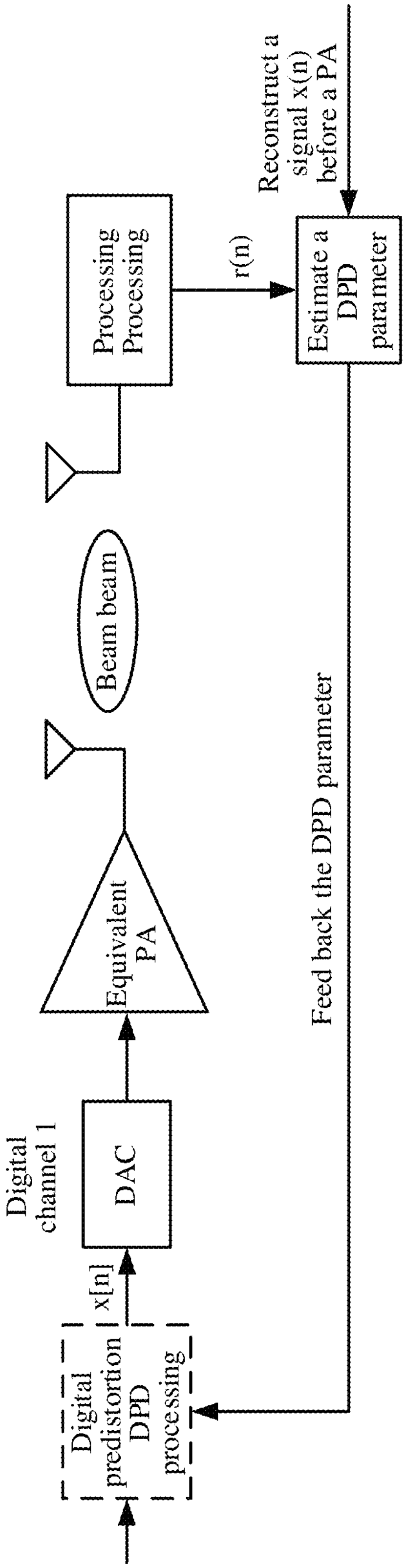
FIG. 16 is a diagram of DPD parameter estimation according to an embodiment of this application.

The following describes step 803 by using an example in which the first communication apparatus determines the DPD parameter of the first antenna port (that is, the DPD parameter of the first digital channel corresponding to the first antenna port). Specifically, as shown in FIG. 7, the first communication apparatus reconstructs a signal x(n) before a PA. The first communication apparatus receives a combined measurement signal r(n) (also referred to as a signal after a PA) by using the first resource. A quantity of sampling points of the measurement signal is N. The first communication apparatus determines, based on the second configuration information, that the second communication apparatus configures a memory polynomial model and a DPD model order (which specifically includes a highest non-linear order k and a memory depth m) for the first digital channel. It can be learned from the foregoing related descriptions of FIG. 7 that, the non-linear characteristic of the one or more PAs corresponding to the first digital channel may be considered as the non-linear characteristic of the equivalent PA, which is specifically shown in FIG. 16. Therefore, x(n) may be represented as:

$$x(n)=\sum_{k=1}^{K}\sum_{m=0}^{M-1}c_{k,m}|r(n-m)|^{k-1}r(n-m) \quad \text{Formula 6}$$

K is the highest non-linear order, and M is the memory depth. $c_{k,m}$ is a DPD parameter to be estimated. $c_{k,m}$ may be represented by using a vector, and specifically $c=[c_{1,0}, c_{2,0}, ***, c_{K,(M-1)}]^T$. A polynomial kernel function $\phi_{km}(r)=|r(n-m)|^{k-1}r(n-m)$. Signals received by the first communication apparatus at different moments on the first resource are represented by using a matrix R, and $R=[\phi_{10}(r), \phi_{20}(r), \ldots, \phi_{K(M-1)}(r)]$. The signal before the PA may be represented as $x=[x(n), x(n+1), \ldots x(n+N-1)]^T$. The signal after the PA $r=[r(n), r(n+1), \ldots r(n+N-1)]^T$. The first communication apparatus estimates the DPD parameter by using a least squares (LS) method. It should be noted that the first communication apparatus may alternatively estimate the DPD parameter by using an iterative algorithm such as a least mean square (LMS) algorithm or a recursive least squares (RLS) algorithm. This is not specifically limited in this application. The DPD parameter obtained through estimation by the first communication apparatus is represented by c':

$$c'=\arg\min_c\|x-Rc\|_2^2=(R^HR)^{-1}R^Hx \quad \text{Formula 7}$$

$$\operatorname{argmin}_c\|x-Rc\|_2^2$$

represents calculating a minimum value of $$\|x-Rc\|_2^2, \|x-Rc\|_2^2$$

represents a square of a two-norm of (x−Rc), and $R^H$ represents conjugate transposition of the matrix R.

The following describes a possible implementation in which the first communication apparatus reconstructs the signal before the PA.

Specifically, the second communication apparatus sends first information to the first communication apparatus. The first information is used by the first communication apparatus to reconstruct the signal before the PA. The first communication apparatus receives the first information from the second communication apparatus.

In a possible implementation, the first communication apparatus reconstructs the signal before the PA based on a predetermined signal sequence and the first information. The predetermined signal sequence may be pre-agreed on by the first communication apparatus and the second communication apparatus, or may be defined in a communication protocol. This is not specifically limited in this application.

In another possible implementation, the first communication apparatus determines, based on the first configuration information and the first information, to reconstruct the signal before the PA. Specifically, the first configuration information includes information such as a type and a length of the signal sequence used to generate the first signal. The first communication apparatus determines the signal sequence based on the first configuration information, and then reconstructs the signal before the PA based on the signal sequence and the first information.

Optionally, the first information indicates at least one of the following: a type of a filter, a filter coefficient, and inverse fast Fourier transform (IFFT) processing that are used by the second communication apparatus to generate the signal before the PA.

It should be noted that the foregoing are two possible implementations of reconstructing the signal before the PA by the first communication apparatus. During actual application, the first communication apparatus may alternatively reconstruct the signal before the PA based on the first signal received by using the first resource. This is not specifically limited in this application.

It should be noted that, optionally, the second communication apparatus generates the signal before the PA, and the signal before the PA is not processed through a crest factor reduction (CFR) operation.

For example, as shown in FIG. 5, the second communication apparatus performs IFFT processing on a baseband signal, and then performs filter processing on the baseband signal to obtain the signal before the PA. Before the second communication apparatus generates the signal before the PA, the CFR operation and the DPD processing are not performed. Usually, a filtered signal undergoes the CFR operation to reduce a peak-to-average ratio (PAPR) of the signal. However, this also causes signal distortion, and consequently, it is difficult to reconstruct the signal before the PA. Therefore, the second communication apparatus does not further perform the CFR operation on the baseband signal. In this case, the first communication apparatus may reconstruct the signal before the PA based on the first information and the predetermined signal sequence. For example, the first communication apparatus generates the signal sequence. Then, the first communication apparatus places the signal sequence at a frequency domain position corresponding to the first resource, and performs the IFFT processing to obtain a time domain symbol. Then, the first communication apparatus performs discrete Fourier transform processing on the time domain symbol. The first communication apparatus filters, by using a filter, the signal on which the discrete Fourier transform processing is performed, to obtain the signal before the PA.

It should be noted that the foregoing describes, by using FIG. 5, a process in which the second communication apparatus generates the signal before the PA. FIG. 5 is merely an example. During actual application, in addition to the processing operation shown in FIG. 5, the second communication apparatus may further obtain the signal before the PA with reference to another processing operation. This is not specifically limited in this application.

804: The first communication apparatus sends the first DPD parameter information to the second communication apparatus. Correspondingly, the second communication apparatus receives the first DPD parameter information from the first communication apparatus.

Optionally, the first DPD parameter information includes information about a first DPD parameter. The information about the first DPD parameter is determined by the first communication apparatus based on a first signal received by using the first resource. The information about the first DPD parameter is used to determine a transmission parameter of the first antenna port.

Specifically, the first communication apparatus determines, based on the first signal received by using the first resource, the first DPD parameter corresponding to the first antenna port. Then, the first communication apparatus may send the information about the first DPD parameter to the second communication apparatus.

Optionally, the first DPD parameter information includes information about a second DPD parameter. The information about the second DPD parameter is determined by the first communication apparatus based on a first signal received by using the second resource. The information about the second DPD parameter is used to determine a transmission parameter of the second antenna port.

It should be noted that, the information about the DPD parameters that is included in the first DPD parameter information may be reported simultaneously or separately. This needs to be specifically determined with reference to a reporting configuration.

For example, as shown in FIG. 14, the second communication apparatus configures the first communication apparatus to report the information about the first DPD parameter and the information about the second DPD parameter together. Therefore, the first communication apparatus may report the information about the first DPD parameter and the information about the second DPD parameter together to the second communication apparatus.

For example, as shown in FIG. 15, the second communication apparatus configures the first communication apparatus to first measure the first signal sent through the first antenna port and report the information about the first DPD parameter, and then measure the first signal sent through the second antenna port and report the information about the first DPD parameter. In this case, the first communication apparatus separately reports the information about the first DPD parameter and the information about the second DPD parameter. In this implementation, the first antenna port and the second antenna port are a same antenna port.

Based on the foregoing step 801*a*, optionally, the foregoing step 804 specifically includes:

The first communication apparatus sends the first DPD parameter information to the second communication apparatus based on the second configuration information.

For example, the first DPD parameter information includes the information about the first DPD parameter and the information about the second DPD parameter. The second configuration information is used to configure the first communication apparatus to use the DPD parameter reporting format shown in FIG. 13*a*. In this case, the first communication apparatus may report the information about the first DPD parameter and the information about the second DPD parameter based on the DPD parameter reporting format shown in FIG. 13*a*.

Optionally, the embodiment shown in FIG. 8 further includes step 805. Step 805 may be performed after step 804.

805: The second communication apparatus determines, based on the first DPD parameter information, a transmission parameter of an antenna port configured to send the at least one first signal.

For example, the first DPD parameter information includes the information about the first DPD parameter. The information about the first DPD parameter is determined by the first communication apparatus based on the first signal received by using the first resource. The first signal on the first resource is sent by the second communication apparatus through the first antenna port. In this case, the second communication apparatus may determine the transmission parameter of the first antenna port based on the information about the first DPD parameter. Subsequently, when the second communication apparatus sends a data signal through the first antenna port, the second communication apparatus performs the DPD processing on the data signal by using the transmission parameter of the first antenna port. In this way, signal non-linear distortion caused by the PA corresponding to the first digital channel corresponding to the first antenna port is compensated for in advance, and linearity of a data signal output by the second communication apparatus is improved.

Optionally, the first DPD parameter information further includes the information about the second DPD parameter. The information about the second DPD parameter is determined by the first communication apparatus based on the first signal received by using the second resource. The first signal on the second resource is sent by the second communication apparatus through the second antenna port. In this case, the second communication apparatus may determine the transmission parameter of the second antenna port based on the information about the second DPD parameter. Subsequently, when the second communication apparatus sends a data signal through the second antenna port, the second communication apparatus performs the DPD processing on the data signal by using the transmission parameter of the second antenna port. In this way, signal non-linear distortion caused by the PA corresponding to the second digital channel corresponding to the second antenna port is compensated for in advance, and linearity of a data signal output by the second communication apparatus is improved.

In this embodiment of this application, the first communication apparatus receives the first configuration information from the second communication apparatus, where the first configuration information includes at least one configured resource. Then, the first communication apparatus receives the at least one first signal from the second communication apparatus by using the at least one resource. The first communication apparatus measures the at least one first signal received by the first communication apparatus, to obtain the first DPD parameter information. The first communication apparatus sends the first DPD parameter information to the second communication apparatus. It can be learned that in the technical solutions provided in this application, the second communication apparatus may configure the at least one resource for the first communication apparatus by using the first configuration information. The first communication apparatus receives the at least one first signal from the second communication apparatus by using the at least one resource, and measures the at least one first signal to obtain the first DPD parameter information. The first communication apparatus sends the first DPD parameter information to the second communication apparatus, so that the second communication apparatus compensates, based on the first DPD parameter information, for signal non-linear distortion caused by using one or more power amplifiers to send a signal on a second communication apparatus side, to improve the linearity of the signal sent by the second communication apparatus.

It should be noted that the foregoing describes the technical solutions of this application by using an example in which the first communication apparatus is a terminal device and the second communication apparatus is a network device. If the first communication apparatus is a network device, and the second communication apparatus is a terminal device, the information in step 801 and step 801*a* in the embodiment shown in FIG. 8 needs to be sent by the first communication apparatus to the second communication apparatus. In other words, the network device sends the first configuration information and the second configuration information to the terminal device.

This application further provides another embodiment. This embodiment is similar to the embodiment shown in FIG. 8, and a difference lies in that the foregoing step 801 is an optional step, but the foregoing step 801*a* is a mandatory step. Correspondingly, the foregoing step 803 is replaced with: The first communication apparatus determines the first DPD parameter information based on the second configuration information and the at least one first signal received by the first communication apparatus. The foregoing step 804 is replaced with: The first communication apparatus sends the first DPD parameter information to the second communication apparatus based on the second configuration information.

Figure 17:
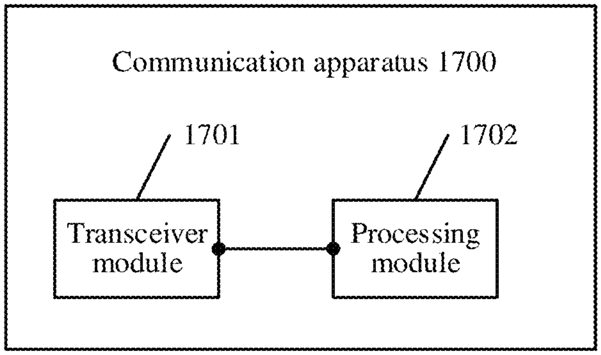
FIG. 17 is a diagram of a structure of a communication apparatus according to an embodiment of this application.

A communication apparatus provided in this embodiment of this application is described below. FIG. 17 is a diagram of a structure of a communication apparatus according to an embodiment of this application. The communication apparatus may be configured to perform the steps performed by the first communication apparatus in the embodiment shown in FIG. 8. For details, refer to the related descriptions in the foregoing method embodiments.

The communication apparatus 1700 includes a transceiver module 1701 and a processing module 1702.

The transceiver module 1701 may implement a corresponding communication function, and the transceiver module 1701 may also be referred to as a communication interface or a communication unit. The processing module 1702 is configured to perform a processing operation.

Optionally, the communication apparatus 1700 may further include a storage module. The storage module may be configured to store instructions and/or data. The processing module 1702 may read the instructions and/or the data in the storage module, so that the communication apparatus implements the method embodiment shown in FIG. 8.

The communication apparatus 1700 may be configured to execute the action performed by the first communication apparatus in the foregoing method embodiments. The communication apparatus 1700 may be the first communication apparatus or a part that may be disposed in the first communication apparatus. The transceiver module 1701 is configured to perform a receiving-related operation on a side of the first communication apparatus in the foregoing method embodiments, and the processing module 1702 is configured to perform a processing-related operation on the side of the first communication apparatus in the foregoing method embodiments.

Optionally, the transceiver module 1701 may include a sending module and a receiving module. The sending module is configured to perform the sending operation of the first communication apparatus in the foregoing method embodiment shown in FIG. 8. The receiving module is configured to perform the receiving operation of the first communication apparatus in the foregoing method embodiment shown in FIG. 8.

It should be noted that the communication apparatus 1700 may include a sending module, but does not include a receiving module. Alternatively, the communication apparatus 1700 may include a receiving module, but not include a sending module. This may be specifically determined depending on whether the foregoing solution performed by the communication apparatus 1700 includes a sending action and a receiving action.

For example, the communication apparatus 1700 is configured to perform the following Solution The transceiver module 1701 is configured to receive first configuration information from a second communication apparatus, where the first configuration information includes information about at least one resource; and receive at least one first signal from the second communication apparatus by using the at least one resource.

The processing module 1702 is configured to determine first DPD parameter information based on the at least one first signal received by the communication apparatus 1700.

The transceiver module 1701 is further configured to send the first DPD parameter information to the second communication apparatus.

In a possible implementation, the transceiver module 1701 is further configured to:

receive second configuration information from the second communication apparatus, where the second configuration information is used to configure at least one of the following: a DPD parameter reporting format, a DPD model type used by the first communication apparatus to calculate a DPD parameter, a DPD model order, and a DPD model bandwidth, where the DPD parameter reporting format indicates a reporting requirement for a non-linear order and a memory depth in the DPD parameter.

In another possible implementation, the DPD model order includes at least one of the following: the non-linear order, the memory depth, and a cross-term length.

In another possible implementation, the at least one resource includes a first resource, and the first resource corresponds to a first antenna port.

In another possible implementation, the first DPD parameter information includes information about a first DPD parameter, the information about the first DPD parameter is determined by a first signal received by the communication apparatus 1700 by using the first resource, and the information about the first DPD parameter is used to determine a transmission parameter of the first antenna port.

In another possible implementation, the at least one resource further includes a second resource, and the second resource corresponds to a second antenna port.

In another possible implementation, the first DPD parameter information further includes information about a second DPD parameter, the information about the second DPD parameter is determined by a first signal received by the communication apparatus 1700 by using the second resource, and the information about the second DPD parameter is used to determine a transmission parameter of the second antenna port.

In another possible implementation, a time domain position occupied by the first resource is different from a time domain position occupied by the second resource.

Figure 18:
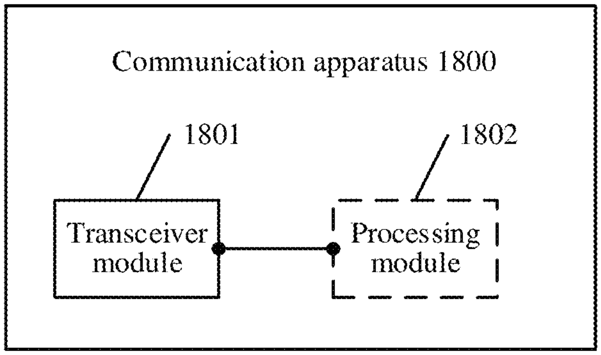
FIG. 18 is a diagram of another structure of a communication apparatus according to an embodiment of this application.

A communication apparatus provided in this embodiment of this application is described below. FIG. 18 is a diagram of a structure of a communication apparatus according to an embodiment of this application. The communication apparatus may be configured to perform the steps performed by the second communication apparatus in the embodiment shown in FIG. 8. For details, refer to the related descriptions in the foregoing method embodiments.

The communication apparatus 1800 includes a transceiver module 1801. Optionally, the communication apparatus 1800 further includes a processing module 1802.

The transceiver module 1801 may implement a corresponding communication function, and the transceiver module 1801 may also be referred to as a communication interface or a communication unit. The processing module 1802 is configured to perform a processing operation.

Optionally, the communication apparatus 1800 may further include a storage module. The storage module may be configured to store instructions and/or data. The processing module 1802 may read the instructions and/or the data in the storage module, so that the communication apparatus implements the method embodiment shown in FIG. 8.

The communication apparatus 1800 may be configured to execute the action performed by the second communication apparatus in the foregoing method embodiments. The communication apparatus 1800 may be the second communication apparatus or a part that may be disposed in the second communication apparatus. The transceiver module 1801 is configured to perform a receiving-related operation on a side of the second communication apparatus in the foregoing method embodiments, and the processing module 1802 is configured to perform a processing-related operation on a side of the second communication apparatus in the foregoing method embodiments.

Optionally, the transceiver module 1801 may include a sending module and a receiving module. The sending module is configured to perform the sending operation of the second communication apparatus in the foregoing method embodiment shown in FIG. 8. The receiving module is configured to perform the receiving operation of the second communication apparatus in the foregoing method embodiment shown in FIG. 8.

It should be noted that the communication apparatus 1800 may include a sending module, but does not include a receiving module. Alternatively, the communication apparatus 1800 may include a receiving module, but not include a sending module. This may be specifically determined depending on whether the foregoing solution performed by the communication apparatus 1800 includes a sending action and a receiving action.

For example, the communication apparatus 1800 may be configured to perform the following solution.

The transceiver module 1801 is configured to send first configuration information to a first communication apparatus, where the first configuration information includes information about at least one resource; send at least one first signal to the first communication apparatus by using the at least one resource; and receive first predistortion DPD parameter information from the first communication apparatus, where the first DPD parameter information is determined by the first communication apparatus based on the received at least one first signal.

In a possible implementation, the transceiver module 1801 is further configured to:

send second configuration information to the first communication apparatus, where the second configuration information is used to configure at least one of the following: a DPD parameter reporting format, a DPD model type used by the first communication apparatus to calculate a DPD parameter, a DPD model order, and a DPD model bandwidth, where the DPD parameter reporting format indicates a reporting requirement for a non-linear order and a memory depth in the DPD parameter.

In another possible implementation, the DPD model order includes at least one of the following: the non-linear order, the memory depth, and a cross-term length.

In another possible implementation, the at least one resource includes a first resource, and the first resource corresponds to a first antenna port.

In another possible implementation, the first DPD parameter information includes information about a first DPD parameter, the information about the first DPD parameter is determined by the first communication apparatus based on a first signal received by using the first resource, and the information about the first DPD parameter is used to determine a transmission parameter of the first antenna port.

In another possible implementation, the at least one resource further includes a second resource, and the second resource corresponds to a second antenna port.

In another possible implementation, the first DPD parameter information further includes information about a second DPD parameter, the information about the second DPD parameter is determined by the first communication apparatus based on a first signal received by using the second resource, and the information about the second DPD parameter is used to determine a transmission parameter of the second antenna port.

In another possible implementation, a time domain position occupied by the first resource is different from a time domain position occupied by the second resource.

In another possible implementation, the processing module 1802 is further configured to:

determine, based on the first DPD parameter information, a transmission parameter of an antenna port configured to send the at least one first signal.

Figure 19:
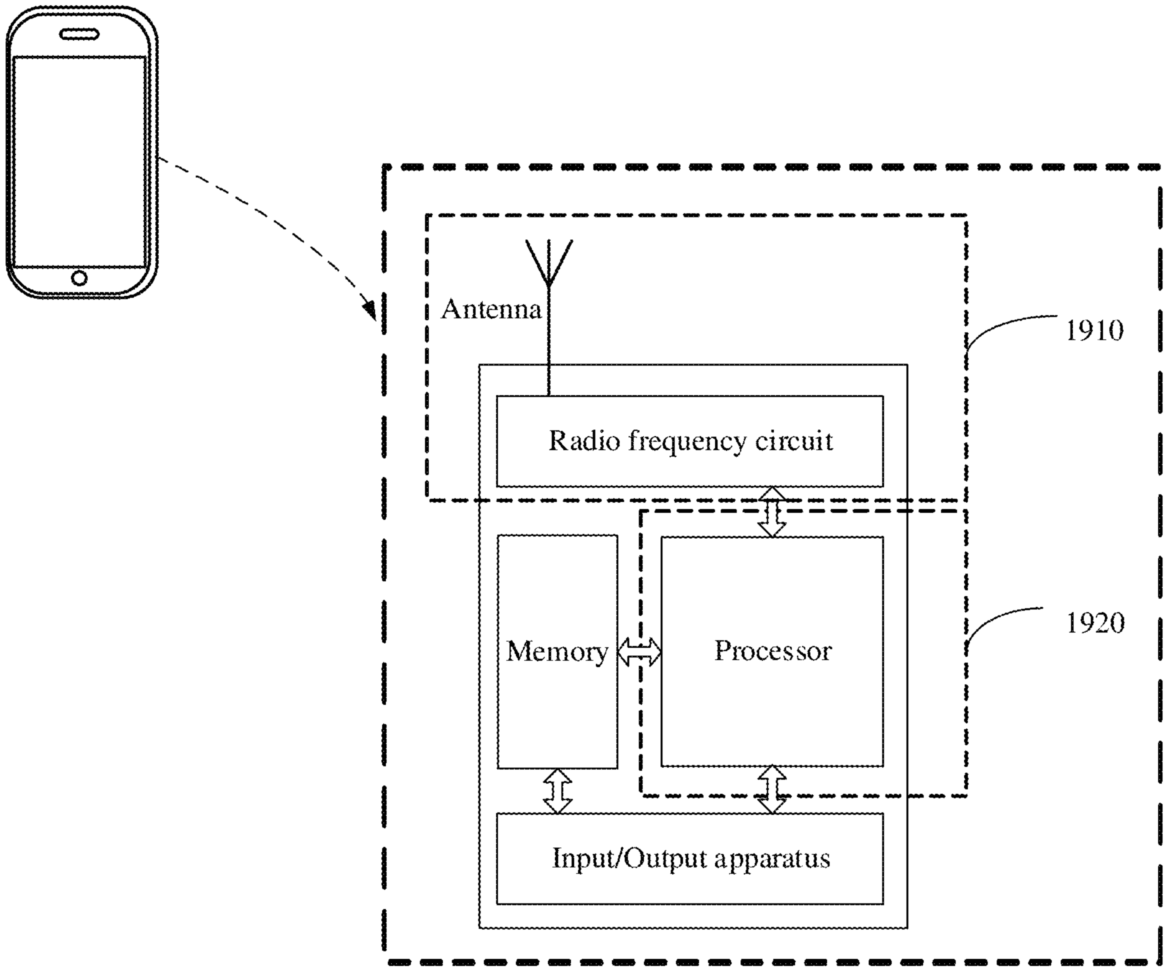
FIG. 19 is a diagram of another structure of a communication apparatus according to an embodiment of this application.

FIG. 19 is a diagram of a possible structure of a first communication apparatus or a second communication apparatus serving as a terminal device below.

FIG. 19 is a diagram of a structure of a simplified terminal device. For ease of understanding and convenience of illustration, in FIG. 19, an example in which the terminal device is a mobile phone is used. As shown in FIG. 19, the terminal device includes a processor, a memory, a radio frequency circuit, an antenna, and an input/output apparatus.

The processor is mainly configured to: process a communication protocol and communication data, control the terminal device, execute a software program, process data of the software program, and the like.

The memory is mainly configured to store the software program and the data.

The radio frequency circuit is mainly configured to perform conversion between a baseband signal and a radio frequency signal, and process the radio frequency signal.

The antenna is mainly configured to receive/send a radio frequency signal in a form of an electromagnetic wave.

The input/output apparatus, such as a touchscreen, a display, or a keyboard, is mainly configured to receive data input by a user and output data to the user.

It should be noted that some types of terminal devices may have no input/output apparatus.

When needing to send data, after performing baseband processing on the to-be-sent data, the processor outputs a baseband signal to the radio frequency circuit; and the radio frequency circuit performs radio frequency processing on the baseband signal and then sends a radio frequency signal to the outside in a form of an electromagnetic wave via the antenna. When data is sent to the terminal device, the radio frequency circuit receives the radio frequency signal via the antenna, converts the radio frequency signal into a baseband signal, and outputs the baseband signal to the processor. The processor converts the baseband signal into data, and processes the data.

For ease of description, only one memory and one processor are shown in FIG. 19. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have a transceiver function may be considered as a transceiver unit of the terminal device, and the processor that has a processing function may be considered as a processing unit of the terminal device. As shown in FIG. 19, the terminal device includes a transceiver unit 1910 and a processing unit 1920. The transceiver unit may also be referred to as a transceiver, a transceiver machine, a transceiver apparatus, or the like. The processing unit may also be referred to as a processor, a processing board, a processing module, a processing apparatus, or the like.

Optionally, a component configured to implement a receiving function in the transceiver unit 1910 may be considered as a receiving unit, and a component configured to implement a sending function in the transceiver unit 1910 may be considered as a sending unit. In other words, the transceiver unit 1910 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receive circuit, or the like. The sending unit sometimes may also be referred to as a transmitter machine, a transmitter, a transmit circuit, or the like.

It should be understood that the transceiver unit 1910 is configured to perform a sending operation and a receiving operation of the first communication apparatus or the second communication apparatus in the foregoing method embodiments, and the processing unit 1920 is configured to perform an operation other than the sending operation and the receiving operation of the first communication apparatus or the second communication apparatus in the foregoing method embodiments.

When the terminal device is a chip, the chip includes a transceiver unit and a processing unit. The transceiver unit may be an input/output circuit or a communication interface. The processing unit is a processor, a microprocessor, an integrated circuit, or a logic circuit integrated on the chip.

Figure 20:
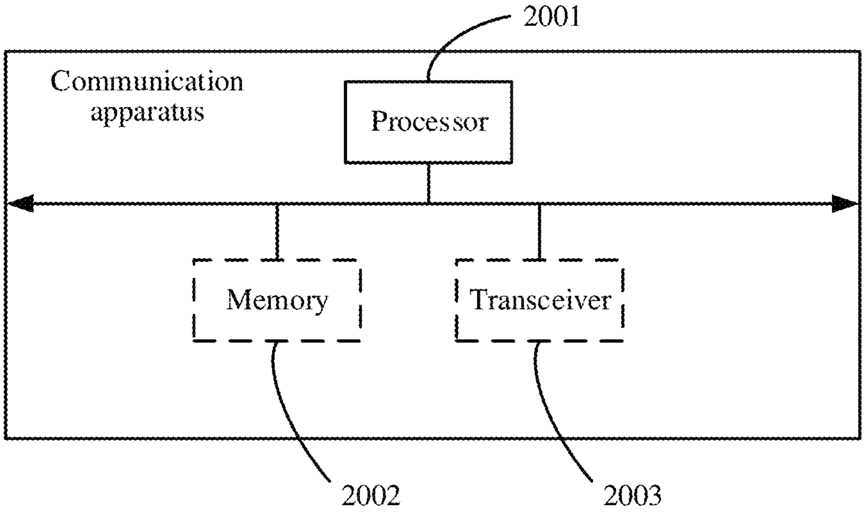
FIG. 20 is a diagram of another structure of a communication apparatus according to an embodiment of this application.

This application further provides a communication apparatus. FIG. 20 is another diagram of a structure of a communication apparatus according to an embodiment of this application. The communication apparatus may be configured to perform the steps performed by the first communication apparatus or the second communication apparatus in the embodiment shown in FIG. 8. For details, refer to the related descriptions in the foregoing method embodiments.

The communication apparatus includes a processor 2001. Optionally, the communication apparatus further includes a memory 2002 and a transceiver 2003.

In a possible implementation, the processor 2001, the memory 2002, and the transceiver 2003 are separately connected through a bus, and the memory stores computer instructions.

Optionally, the communication apparatus may be configured to perform the steps performed by the first communication apparatus in the embodiment shown in FIG. 8. The processing module 1702 in the foregoing embodiment may be specifically the processor 2001 in this embodiment. The transceiver module 1701 in the foregoing embodiment may be specifically the transceiver 2003 in this embodiment.

Optionally, the communication apparatus may be configured to perform the steps performed by the second communication apparatus in the embodiment shown in FIG. 8. The processing module 1802 in the foregoing embodiment may be specifically the processor 2001 in this embodiment. The transceiver module 1801 in the foregoing embodiment may be specifically the transceiver 2003 in this embodiment.

An embodiment of this application further provides a communication system, the communication system includes a first communication apparatus and a second communication apparatus. The first communication apparatus is configured to perform all or some of the steps performed by the first communication apparatus in the embodiment shown in FIG. 8. The second communication apparatus is configured to perform all or some of the steps performed by the second communication apparatus in the embodiment shown in FIG. 8.

An embodiment of this application further provides a computer program product including instructions. When the computer program product runs on a computer, the computer is enabled to perform the communication method in the embodiment shown in FIG. 8.

An embodiment of this application further provides a computer-readable storage medium including computer instructions. When the computer instructions are run on a computer, the computer is enabled to perform the communication method in the embodiment shown in FIG. 8.

An embodiment of this application further provides a chip apparatus, including a processor, configured to connect to a memory and invoke a program stored in the memory, so that the processor performs the communication method in the embodiment shown in FIG. 8.

The processor mentioned in any of the foregoing may be a general central processing unit, a microprocessor, an application-specific integrated circuit (ASIC), or one or more of integrated circuits configured to control program execution of the communication method in the embodiment shown in FIG. 8. The memory mentioned in any of the foregoing may be a read-only memory (ROM), another type of static storage device that can store static information and instructions, a random access memory (RAM), or the like.

It may be clearly understood by a person skilled in the art that, for convenient and brief description, for detailed working processes of the foregoing system, apparatuses, and units, refer to corresponding processes in the foregoing method embodiments.

In the several embodiments provided in this application, it should be understood that the disclosed system, apparatuses, and method may be implemented in another manner. For example, the described apparatus embodiment is merely an example. For example, division into the units is merely logical function division and may be other division during actual implementation. For example, a plurality of units or components may be combined or integrated into another system, or some characteristics may be ignored or not performed. In addition, the displayed or discussed mutual couplings or direct couplings or communication connections may be implemented by using some interfaces. The indirect couplings or communication connections between the apparatuses or units may be implemented in an electronic form, a mechanical form, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of the software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in embodiments of this application. The foregoing storage medium includes any medium that can store program code, for example, a USB flash drive, a removable hard disk drive, a read-only memory (ROM), a random access memory (RAM), a magnetic disk, or an optical disc.

In conclusion, the foregoing embodiments are merely intended for describing the technical solutions of this application, but not for limiting this application. Although this application is described in detail with reference to the foregoing embodiments, a person of ordinary skill in the art should understand that modifications may still be made to the technical solutions described in the foregoing embodiments or equivalent replacements may be made to some technical characteristics thereof. However, these modifications or replacements do not make essence of the corresponding technical solutions depart from the spirit and scope of the technical solutions in embodiments of this application.

What is claimed is:

1. A communication method, comprising:

receiving, by a first communication apparatus, first configuration information from a second communication apparatus, wherein the first configuration information includes information about at least one resource;

receiving, by the first communication apparatus, at least one first signal from the second communication apparatus using the at least one resource;

determining, by the first communication apparatus, digital predistortion (DPD) parameter information based on the at least one first signal received by the first communication apparatus; and sending, by the first communication apparatus, the DPD parameter information to the second communication apparatus.

2. The method according to claim 1, further comprising:

receiving, by the first communication apparatus, second configuration information from the second communication apparatus, wherein the second configuration information is used to configure at least one of: a DPD parameter reporting format, a DPD model type used by the first communication apparatus to calculate a DPD parameter, a DPD model order, and/or a DPD model bandwidth, wherein the DPD parameter reporting format indicates a reporting requirement for a non-linear order and a memory depth in the DPD parameter.

3. The method according to claim 2, wherein the DPD model order comprises at least one of: the non-linear order, the memory depth, and/or a cross-term length.

4. The method according to claim 1, wherein the at least one resource comprises a first resource corresponding to a first antenna port.

5. The method according to claim 4, wherein the DPD parameter information comprises information about a first DPD parameter, the information about the first DPD parameter is determined by the first communication apparatus based on a first signal received by using the first resource, and the information about the first DPD parameter is used to determine a transmission parameter of the first antenna port.

6. The method according to claim 4, wherein the at least one resource further comprises a second resource corresponding to a second antenna port.

7. The method according to claim 6, wherein the DPD parameter information further comprises information about a second DPD parameter, the information about the second DPD parameter is determined by the first communication apparatus based on a first signal received using the second resource, and the information about the second DPD parameter is used to determine a transmission parameter of the second antenna port.

8. The method according to claim 6, wherein a time domain position occupied by the first resource is different from a time domain position occupied by the second resource.

9. A communication apparatus, comprising:

at least one processor; and one or more memories coupled to the at least one processor and storing program instructions that, when executed by the at least one processor, cause the communication apparatus to perform operations comprising:

receiving, first configuration information from a second communication apparatus, wherein the first configuration information comprises information about at least one resource;

receiving, at least one first signal from the second communication apparatus using the at least one resource;

determining, digital predistortion (DPD) parameter information based on the at least one first signal received by the communication apparatus; and sending, the DPD parameter information to the second communication apparatus.

10. The apparatus according to claim 9, wherein the instructions, when executed by the at least one processor, further cause the communication apparatus to perform operations comprising:

receiving, second configuration information from the second communication apparatus, wherein the second configuration information is used to configure at least one of: a DPD parameter reporting format, a DPD model type used by the communication apparatus to calculate a DPD parameter, a DPD model order, and/or a DPD model bandwidth, wherein the DPD parameter reporting format indicates a reporting requirement for a non-linear order and a memory depth in the DPD parameter.

11. The apparatus according to claim 10, wherein the DPD model order comprises at least one of: the non-linear order, the memory depth, and/or a cross-term length.

12. The apparatus according to claim 9, wherein the at least one resource comprises a first resource corresponding to a first antenna port.

13. The apparatus according to claim 12, wherein the DPD parameter information comprises information about a first DPD parameter, the information about the first DPD parameter is determined by the communication apparatus based on a first signal received using the first resource, and the information about the first DPD parameter is used to determine a transmission parameter of the first antenna port.

14. The apparatus according to claim 12, wherein the at least one resource further comprises a second resource corresponding to a second antenna port.

15. The apparatus according to claim 14, wherein the DPD parameter information further comprises information about a second DPD parameter, the information about the second DPD parameter is determined by the communication apparatus based on a first signal received using the second resource, and the information about the second DPD parameter is used to determine a transmission parameter of the second antenna port.

16. The apparatus according to claim 14, wherein a time domain position occupied by the first resource is different from a time domain position occupied by the second resource.

17. A communication apparatus, comprising:

at least one processor; and one or more memories coupled to the at least one processor and storing program instructions that, when executed by the at least one processor, cause the communication apparatus to perform operations comprising:

sending first configuration information to a first communication apparatus, wherein the first configuration information comprises information about at least one resource;

sending, at least one first signal to the first communication apparatus using the at least one resource; and receiving; digital predistortion (DPD) parameter information from the first communication apparatus, wherein the DPD parameter information is determined by the first communication apparatus based on the at least one first signal.

18. The apparatus according to claim 17, wherein the operations further comprise:

sending second configuration information to the first communication apparatus, wherein the second configuration information is used to configure at least one of: a DPD parameter reporting format, a DPD model type used by the first communication apparatus to calculate a DPD parameter, a DPD model order, and/or a DPD model bandwidth, wherein the DPD parameter reporting format indicates a reporting requirement for a non-linear order and a memory depth in the DPD parameter.

19. The apparatus according to claim 18, wherein the DPD model order comprises at least one of: the non-linear order, the memory depth, and/or a cross-term length.

20. The apparatus according to claim 17, wherein the at least one resource comprises a first resource corresponding to a first antenna port.

* * * * *